US012717395B2

(12) United States Patent
Woo et al.

(10) Patent No.: US 12,717,395 B2
(45) Date of Patent: Aug. 25, 2026

(54) DEVICE AND METHOD FOR PROVIDING POWER-SAVING MANAGEMENT FOR EACH SPACE

(71) Applicant: SAMSUNG ELECTRONICS CO., LTD., Suwon-si (KR)

(72) Inventors: Youngchan Woo, Suwon-si (KR); Donghee Kang, Suwon-si (KR); Jiwoo Hong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 105 days.

(21) Appl. No.: 18/779,821

(22) Filed: Jul. 22, 2024

(65) Prior Publication Data

US 2025/0117064 A1 Apr. 10, 2025

Related U.S. Application Data

(63) Continuation of application No. PCT/KR2024/009594, filed on Jul. 5, 2024.

(30) Foreign Application Priority Data

Oct. 10, 2023 (KR) ........................ 10-2023-0134218

(51) Int. Cl.
*G06F 1/3234* (2019.01)
*G06F 1/3231* (2019.01)

(52) U.S. Cl.
CPC .......... *G06F 1/3234* (2013.01); *G06F 1/3231* (2013.01)

(58) Field of Classification Search
CPC ............................. G06F 1/3234; G06F 1/3231
(Continued)

(56) References Cited

U.S. PATENT DOCUMENTS 6,606,712 B1 * 8/2003 Miura .................. G06F 1/3203 713/320
6,715,088 B1 * 3/2004 Togawa .................. H04L 12/12 713/320

(Continued)

FOREIGN PATENT DOCUMENTS

EP 2713681 A1 * 4/2014 ........... H05B 47/155
KR 10-2011-0136381 A 12/2011

(Continued)

OTHER PUBLICATIONS

International Search Report (PCT/ISA/210) issued on Sep. 30, 2024 by the International Searching Authority in International Patent Application No. PCT/KR2024/009594.

(Continued)

*Primary Examiner* — Paul R. Myers
(74) *Attorney, Agent, or Firm* — Sughrue Mion, PLLC

(57) ABSTRACT

Provided is a device and method for management of power usage in multiple areas, the device including: at least one memory storing one or more instructions and identification information for each of one or more first devices corresponding to a first space and identification information for each of one or more second devices corresponding to a second space different from the first space; and at least one processor configured to execute the instructions; wherein the one or more instructions, when executed by the at least one processor, cause the device to: obtain a first signal related to a first device of the one or more first devices, obtain a second signal after obtaining the first signal, wherein the second signal is related to a second device of the one or more second devices, and based on obtaining the second signal, set each of the one or more first devices to a power saving state.

20 Claims, 28 Drawing Sheets

(58) Field of Classification Search
USPC .......................................................... 713/320
See application file for complete search history.

(56) References Cited

U.S. PATENT DOCUMENTS

| | | | | |
|---|---|---|---|---|
| 7,281,142 | B2 * | 10/2007 | Jones | G06F 21/81 713/320 |
| 8,773,719 | B2 * | 7/2014 | Baba | H04N 1/00891 700/297 |
| 9,979,201 | B2 | 5/2018 | Seo et al. | |
| 10,491,001 | B2 | 11/2019 | Lim et al. | |
| 11,146,647 | B2 | 10/2021 | Jung et al. | |
| 11,700,422 | B1 * | 7/2023 | Garner | H04N 21/44218 725/14 |
| 11,809,151 | B1 * | 11/2023 | Brett | G05B 19/042 |
| 2002/0135474 | A1 * | 9/2002 | Sylliassen | G06F 1/3203 348/E5.127 |
| 2010/0188279 | A1 * | 7/2010 | Shamilian | H04W 4/02 341/176 |
| 2011/0157468 | A1 * | 6/2011 | Dai | H04N 5/63 348/730 |
| 2012/0023353 | A1 * | 1/2012 | Lee | H04N 13/398 713/323 |
| 2012/0194082 | A1 * | 8/2012 | Huang | H05B 45/20 315/297 |
| 2012/0319596 | A1 * | 12/2012 | Nanahara | H05B 47/125 315/153 |
| 2013/0103207 | A1 * | 4/2013 | Ruff | G01K 1/02 700/278 |
| 2013/0258424 | A1 * | 10/2013 | Ono | H04N 1/00323 358/475 |
| 2015/0084522 | A1 * | 3/2015 | Yamamoto | H05B 47/16 315/154 |
| 2016/0094700 | A1 * | 3/2016 | Lee | H04W 8/245 455/419 |
| 2016/0224090 | A1 * | 8/2016 | Gendler | G06F 9/461 |
| 2016/0274649 | A1 * | 9/2016 | Su | G06F 1/3265 |
| 2016/0277204 | A1 | 9/2016 | Kang | |
| 2020/0125377 | A1 * | 4/2020 | van Scheltinga | G06F 16/24575 |
| 2023/0229959 | A1 | 7/2023 | Sinha | |
| 2024/0098415 | A1 * | 3/2024 | Yasuchika | H04R 3/12 |

FOREIGN PATENT DOCUMENTS

| | | | |
|---|---|---|---|
| KR | 10-1116970 | B1 | 3/2012 |
| KR | 10-2015-0029041 | A | 3/2015 |
| KR | 10-1974592 | B1 | 5/2019 |
| KR | 10-2088526 | B1 | 4/2020 |
| KR | 10-2020-0084268 | A | 7/2020 |
| KR | 10-2334599 | B1 | 12/2021 |
| KR | 10-2353587 | B1 | 1/2022 |
| KR | 10-2022-0094839 | A | 7/2022 |
| KR | 10-2511006 | B1 | 3/2023 |

OTHER PUBLICATIONS

Written Opinion (PCT/ISA/237) issued on Sep. 30, 2024 by the International Searching Authority in International Patent Application No. PCT/KR2024/009594.

* cited by examiner

| | 301 | 302 | 303 | 304 | 305 | 306 | 307 | 308 |
|---|---|---|---|---|---|---|---|---|
| | Space Identification Information | Device Identification Information | Type | Absence Estimation Group | Occupancy Estimation Group | Power Saving Standby? | Power Saving? | Pre-Power Saving State Information |
| 310 | Living Room | L01L | Lighting Lamp | ○ | ○ | ○ | – | – |
| | Living Room | L02S | Speaker | – | ○ | ○ | – | – |
| | Living Room | L03T | TV | ○ | ○ | ○ | – | – |
| | Living Room | L04C | Air Conditioner | ○ | ○ | ○ | – | – |
| | Living Room | L05R | Cleaning Robot | – | – | ○ | – | – |
| | Living Room | L06N | Laptop Computer | ○ | ○ | ○ | – | – |
| 320 | Bedroom | B01L | Ceiling Light | ○ | ○ | – | – | – |
| | Bedroom | B02A | Air Purifier | – | ○ | – | – | – |
| | Bedroom | B03S | Speaker | – | ○ | – | – | – |
| | Bedroom | B04T | TV | ○ | ○ | – | – | – |
| | Bedroom | B05C | Air Conditioner | ○ | ○ | – | – | – |
| | Bedroom | B06M | Vacuum Cleaner | – | – | – | – | – |
| | Bedroom | B07N | Refrigerator | – | – | – | – | – |
| 330 | Kitchen | K01L | Ceiling Light | ○ | ○ | – | – | – |
| | Kitchen | K02I | Electric Range | ○ | ○ | – | – | – |
| | Kitchen | K03D | Dishwasher | – | – | – | – | – |
| | Kitchen | K04R | Refrigerator | – | – | – | – | – |

START
501
OBTAIN SIGNAL
502
SIGNAL REGARDING DEVICE UNDER SPACE-SPECIFIC POWER-SAVING MANAGEMENT?
NO
YES
503
DEVICE OF THE SIGNAL IS IN POWER SAVING STATE OR POWER SAVING STANDBY STATE?
NO
504
DEVICE SET IN POWER SAVING STANDBY STATE PRESENT?
YES
YES
NO
TO FIG. 6
TO FIG. 7
TO FIG. 8

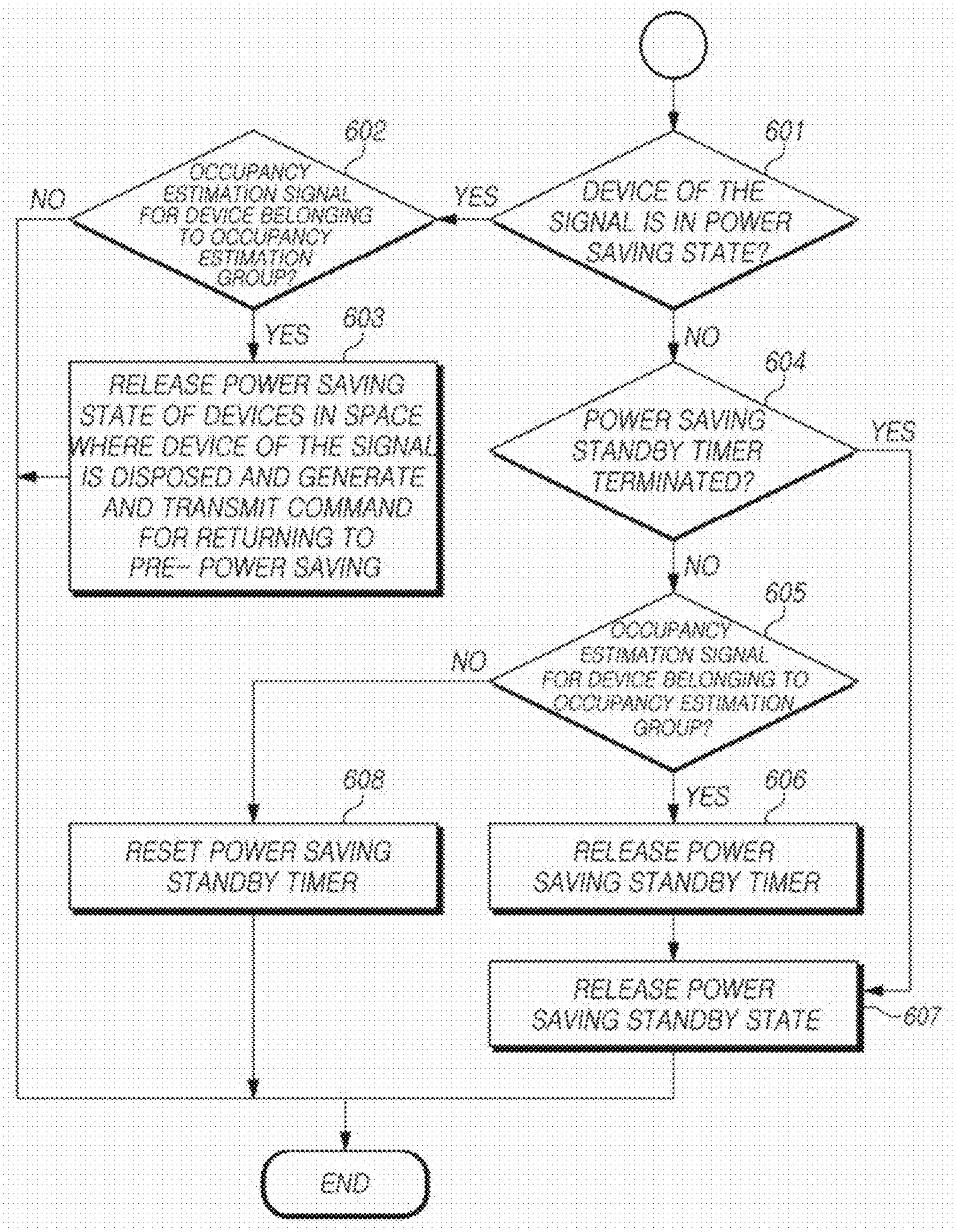

FIG.6
601
DEVICE OF THE SIGNAL IS IN POWER SAVING STATE?
YES
602
OCCUPANCY ESTIMATION SIGNAL FOR DEVICE BELONGING TO OCCUPANCY ESTIMATION GROUP?
NO
YES
603
RELEASE POWER SAVING STATE OF DEVICES IN SPACE WHERE DEVICE OF THE SIGNAL IS DISPOSED AND GENERATE AND TRANSMIT COMMAND FOR RETURNING TO PRE- POWER SAVING
NO
604
POWER SAVING STANDBY TIMER TERMINATED?
YES
NO
605
OCCUPANCY ESTIMATION SIGNAL FOR DEVICE BELONGING TO OCCUPANCY ESTIMATION GROUP?
NO
YES
608
RESET POWER SAVING STANDBY TIMER
606
RELEASE POWER SAVING STANDBY TIMER
RELEASE POWER SAVING STANDBY STATE
607
END

ABSENCE ESTIMATION SIGNAL FOR DEVICE BELONGING TO ABSENCE ESTIMATION GROUP?
701
NO
YES
SET ALL DEVICES UNDER POWER-SAVING MANAGEMENT IN SPACE WHERE DEVICE OF THE SIGNAL BELONGS TO POWER SAVING STANDBY STATE
702
SET POWER SAVING STANDBY TIMER TO PREDETERMINED VALUE
703
END

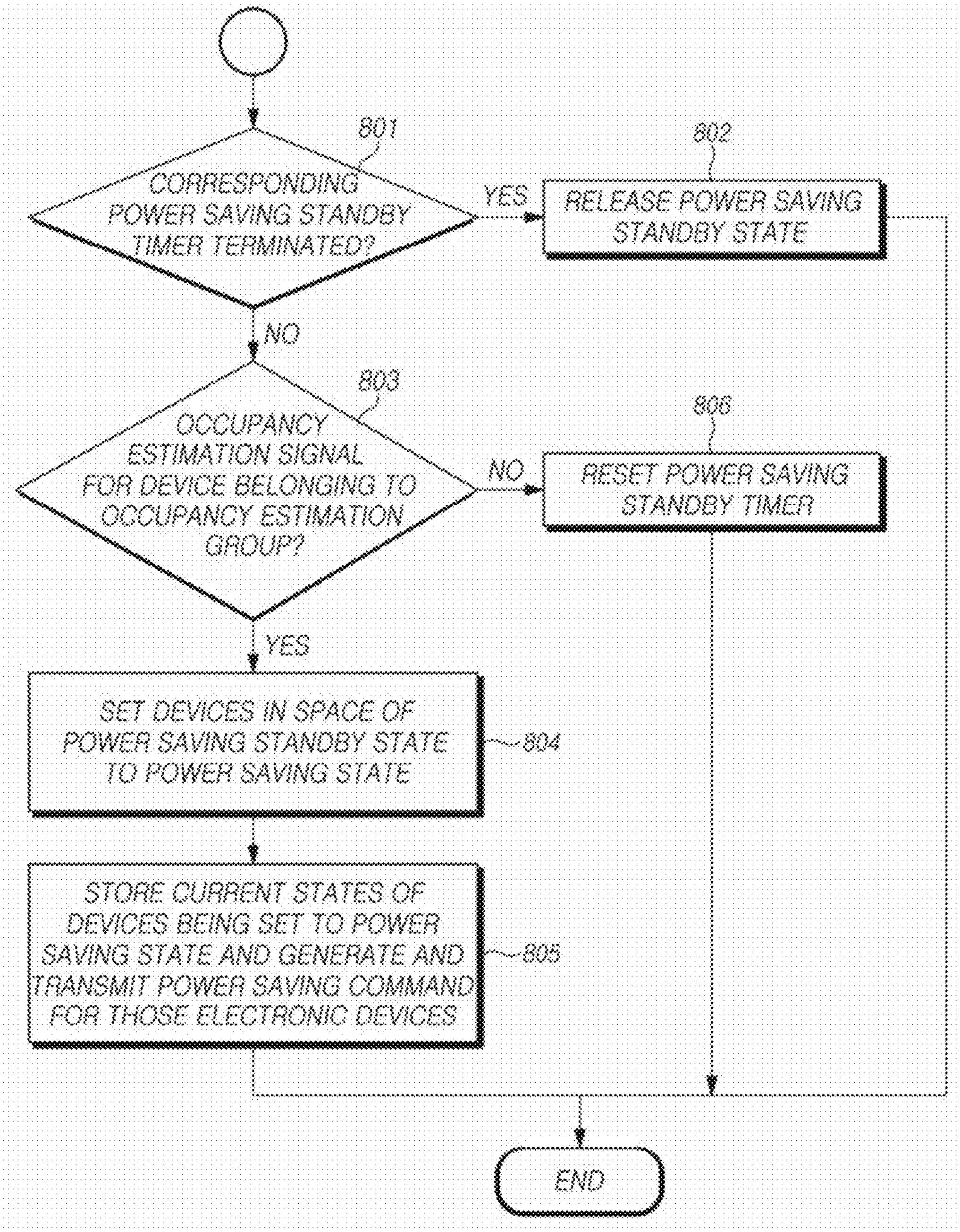

FIG.8
801
CORRESPONDING POWER SAVING STANDBY TIMER TERMINATED?
YES
802
RELEASE POWER SAVING STANDBY STATE
NO
803
OCCUPANCY ESTIMATION SIGNAL FOR DEVICE BELONGING TO OCCUPANCY ESTIMATION GROUP?
NO
806
RESET POWER SAVING STANDBY TIMER
YES
SET DEVICES IN SPACE OF POWER SAVING STANDBY STATE TO POWER SAVING STATE
804
STORE CURRENT STATES OF DEVICES BEING SET TO POWER SAVING STATE AND GENERATE AND TRANSMIT POWER SAVING COMMAND FOR THOSE ELECTRONIC DEVICES
805
END 1010
211
213
212
214
17℃
215
216
Tv Turned Off While Normal Operation In Living Room
1020
211
213
212
214
17℃
215
216
Set Living Room To Power Saving Standby
1030
225
221
226
227
223
228
222
Occurring Bedroom Speaker Turn-On
1040
211
213
212
214
20℃
215
216
Set Living Room To Power Saving 1110
211
213
212
214
17℃
215
216
TV Turned Off While Normal Operation In Living Room
1120
211
213
212
214
17℃
215
216
Set Living Room To Power Saving Standby
1130
232
231
234
233
Occurring Kitchen Dishwasher Turn-On
1140
211
213
212
214
17℃
215
216
Living Room Power Saving Standby Maintained 1210
211
213
212
214
20℃
215
216
Living Room In Power Saving State
1220
211
213
212
214
215
216
Laptop Computer In Living Room Turned On
1230
211
213
212
214
17℃
215
216
Living Room Power Saving Released 211 213 1310 212 214
20℃
215 216
Living Room In Power Saving State 211 213 1320 212 214
20℃
215 216
Cleaning Robot In Living Room Turned On 211 213 1330 212 214
20℃
215 216
Living Room Power Saving Maintained 211
213
1510
212
214
17℃
215
216
Living Room In Power Saving Standby State
232
231
1520
234
2321
232
Electric Range In Kitchen Turned On Electric Range Operation Information Displayed
232
231
1530
234
2322
232
Electric Range User Approval Request Message Displayed
232
231
1540
234
2323
232
Power Saving Control Guide Message Displayed
211
213
1550
212
214
20℃
2321
215
216
Set Living Room To Power Saving State 225
224
221
1610
227
226
223
228
222
(Living Room In Power Saving Standby State)
Bedroom Speaker Turned On
30
31
1620
Switch 'Living Room' To Power Saving State?
Start Power Saving
Cancel
User Device User Approval Request Message Displaed
1630
211
213
212
214
17℃
215
216
Living Room Power Saving Standby Released 1710
211
213
212
214
17℃
215
216
TV Turned On While Normal Operation State In Living Room
1720
TV Screensaver In Living Room Initiated
1730
Set Living Room To Power Saving Standby 1810
225
221
226
227
223
228
222
Bedroom Speaker Turned Off
1820
211
213
212
214
17℃
215
216
Living Room Tv Turned On
1830
211
213
212
214
17℃
216
Living Room Tv Turned Off
1840
211
213
212
214
17℃
216
Set Living Room To Power Saving Standby
1850
225
221
226
227
223
228
222
Bedroom Speaker Turned On
1860
211
213
212
214
20℃
215
216
Set Living Room To Power Saving

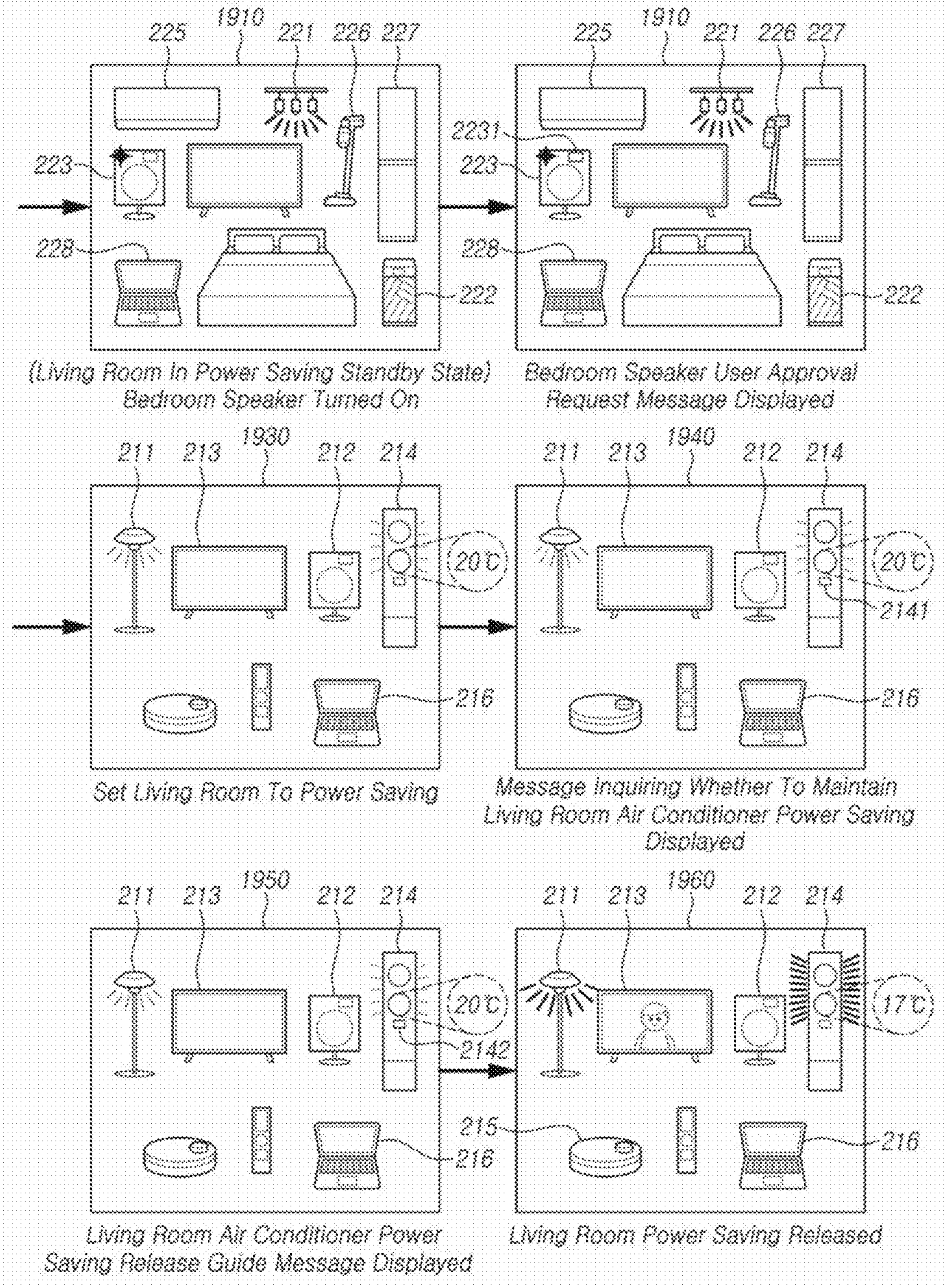

FIG. 19A
1910
225
221
226
227
223
2231
228
222
(Living Room In Power Saving Standby State) Bedroom Speaker Turned On
Bedroom Speaker User Approval Request Message Displayed
1930
1940
211
213
212
214
20℃
2141
216
Set Living Room To Power Saving
Message Inquiring Whether To Maintain Living Room Air Conditioner Power Saving Displayed
1950
1960
2142
215
17℃
Living Room Air Conditioner Power Saving Release Guide Message Displayed
Living Room Power Saving Released

DEVICE AND METHOD FOR PROVIDING POWER-SAVING MANAGEMENT FOR EACH SPACE

CROSS-REFERENCE TO RELATED APPLICATIONS

This application is a by-pass continuation of International Application No. PCT/KR2024/009594, filed on Jul. 5, 2024, which is based on and claims the benefit of Korean Patent Application No. 10-2023-0134218, filed on Oct. 10, 2023, in the Korean Intellectual Property Office, the disclosures of which are incorporated by reference herein in their entirety.

BACKGROUND

1. Field

The disclosure relates to a device and method for providing power-saving management for each space based on user interaction.

2. Description of Related Art

The enhancement of living standards is increasingly leading to the use of various types of electronic devices in home environments. Additionally, many of the newly released home electronic devices are smart devices that are capable of communicating with server devices and may be controlled based on such communication.

With increasing awareness of resource depletion and environmental contamination issues, it is critical to reduce and streamline power consumption. Reducing power consumption and improving efficiency associated with the use of a large number of home electronic devices are also increasingly becoming important issues.

To streamline the power consumption of a large number of home electronic devices, the user's current state, e.g., the user's current location in the home, needs to be considered. However, if a sensor is used to detect and determine the user's current state, it may be difficult and burdensome to install additional sensors which can possibly increase a risk of infringing on the user's privacy as a result of transmitting the data detected by all the sensors.

SUMMARY

Provided is a device and method for reducing power consumption by estimating the presence or absence of a user for a given space based on user interaction or control information for home electronic devices, without raising concerns about privacy infringement, by directly detecting the user's current state with a sensor or providing the detection result over a communication link, and controlling the power or operational state of a plurality of electronic devices based on the estimation.

According to an aspect of the disclosure, a device includes: at least one memory storing one or more instructions and identification information for each of one or more first devices corresponding to a first space and identification information for each of one or more second devices corresponding to a second space different from the first space; and at least one processor configured to execute the instructions; wherein the one or more instructions, when executed by the at least one processor, cause the device to: obtain a first signal related to a first device of the one or more first devices, obtain a second signal after obtaining the first signal, wherein the second signal is related to a second device of the one or more second devices, and based on obtaining the second signal, set each of the one or more first devices to a power saving state.

The one or more instructions, when executed by the at least one processor, may further cause the device to: classify the first device into an absence estimation group and store information related to the first device in the at least one memory, identify whether the first signal is a first type signal related to predetermined characteristics of the absence estimation group, and based on identifying that the first signal is the first type signal, set each of the one or more first devices to a power saving standby state.

The first type signal may include at least one of a power turn-off signal for the first device, a designated operation end signal for the first device, and a signal indicating that a cessation of user interaction with the first device exceeds a predetermined time.

The one or more instructions, when executed by the at least one processor, may further cause the device to set each of the one or more first devices to the power saving standby state by setting a duration of a power saving standby timer to a predetermined value.

The one or more instructions, when executed by the at least one processor, may further cause the device to: classify the second device into an occupancy estimation group and store information related to the second device in the at least one memory, and set each of the one or more first devices to the power saving state based on identifying that the second signal is a second type signal related to predetermined characteristics of the occupancy estimation group.

The one or more instructions, when executed by the at least one processor, may further cause the device to, based on identifying that the second signal is not the second type signal, extend the duration of the power saving standby timer.

The one or more instructions, when executed by the at least one processor, may further cause the device to, based on not receiving the second type signal before an end of the duration of the power saving standby timer, release each of the one or more first devices from the power saving standby state.

The second type signal may include a user input signal for activating an operation of the second device.

The one or more instructions, when executed by the at least one processor, may further cause the device to store current state information corresponding to each of the one or more first devices in the at least one memory as part of setting each of the one or more first devices to the power saving state.

The one or more instructions, when executed by the at least one processor, may further cause the device to set each of the one or more first devices to the power saving state by transmitting a control command for each of the one or more first devices to enter into a predetermined power saving mode.

The one or more instructions, when executed by the at least one processor, may further to cause the device to: set each of the one or more first devices to the power saving state by transmitting a confirmation request related to a power saving state setting to a predetermined device, and based on obtaining confirmation of the power saving state setting from the predetermined device, setting each of the one or more first devices to the power saving state.

The predetermined device may include at least one of a predetermined user terminal, the second device, and a predetermined device among the one or more first devices.

The one or more instructions, when executed by the at least one processor, may further cause the device to: obtain a third signal related to a device of one or more first devices set to the power saving state, and based on receiving the third signal, return each of the one or more first devices set to the power saving state to a state preceding the power saving state using the stored current state information.

The one or more instructions, when executed by the at least one processor, further cause the device to: classify the device of the one or more first devices into a power saving release group and store information related to the device classified into the power saving release group in the at least one memory, and return each of the one or more first devices to the state preceding the power saving state based on identifying that the third signal is related to the device.

The one or more instructions, when executed by the at least one processor, are may further configured to cause the device to: transmit, to a predetermined device among the one or more first devices, a message inquiring whether to release the power saving state for each of the one or more first devices.

According to an aspect of the disclosure, a method for space-specific power-saving management includes: obtaining a first signal related to a first device of one or more first devices disposed in a first space; after obtaining the first signal, obtaining a second signal related to a second device of one or more second devices disposed in a second space different from the first space; and based on obtaining the second signal, setting each of the one or more first devices to a power saving state.

At least one of the one or more first devices may be classified into an absence estimation group, and the method may further include: identifying whether the first signal is a first type signal related to predetermined characteristics of the absence estimation group; and based on identifying that the first signal is the first type signal, setting each of the one or more first devices to a power saving standby state.

At least one of the one or more second devices is classified into an occupancy estimation group, and the setting each of the one or more first devices to the power saving state based on obtaining the second signal may include: identifying whether the second signal is a second type signal related to predetermined characteristics of the occupancy estimation group; and based on identifying that the second signal is the second type signal, setting each of the one or more first devices to the power saving state.

The setting each of the one or more first devices to the power saving state may further include: transmitting a confirmation request related to a power saving state setting to a predetermined device; and based on obtaining confirmation of the power saving state setting from the predetermined device, setting each of the one or more first devices to the power saving state.

At least one of the one or more first devices is classified into a power saving release group, and the method may further include: obtaining a third signal related to a device of the one or more first devices set to the power saving state; and based on identifying that the third signal is related to a first device of the one or more first devices set to the power saving state and classified into the power saving release group, returning each of the one or more first devices to a state preceding the setting each of the one or more first devices to the power saving state.

According to an aspect of the disclosure, a device includes: at least one memory storing one or more instructions and identification information for each of one or more first devices corresponding to a first space and identification information for each of one or more second devices corresponding to a second space different from the first space, and at least one processor configured to executed the one or more instructions, wherein the one or more instructions, when executed by the at least one processor, cause the device to: set each of the one or more first devices in a power saving standby state for a predetermined time based on a first signal received from a first device of the one or more first devices, based on not receiving a second signal from any of the one or more second devices prior to an end of the predetermined time, releasing the one or more first devices from the power saving standby state, and based on received the second signal from a second device of the one or more second devices prior to the end of the predetermined time, set each of the one or more first devices to a power saving state, wherein the first signal includes information indicating a user's absence from the first space, and the second signal includes information indicating a user's presence in the second space.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 3 is a view schematically illustrating an example database configuration that may be used for space-specific power-saving management according to one or more embodiments;

FIG. 6 is a flowchart schematically illustrating an example procedure related to releasing the power saving state or the power saving standby state for electronic devices in the power saving state or the power saving standby state according to one or more embodiments;

FIG. 8 is a flowchart schematically illustrating an example procedure related to setting electronic devices to a power saving standby state to a power saving state according to one or more embodiments;

FIG. 19A is a view schematically illustrating an example situation in which space-specific power-saving management is performed on electronic devices according to one or more embodiments;

DETAILED DESCRIPTION

Figure 1:
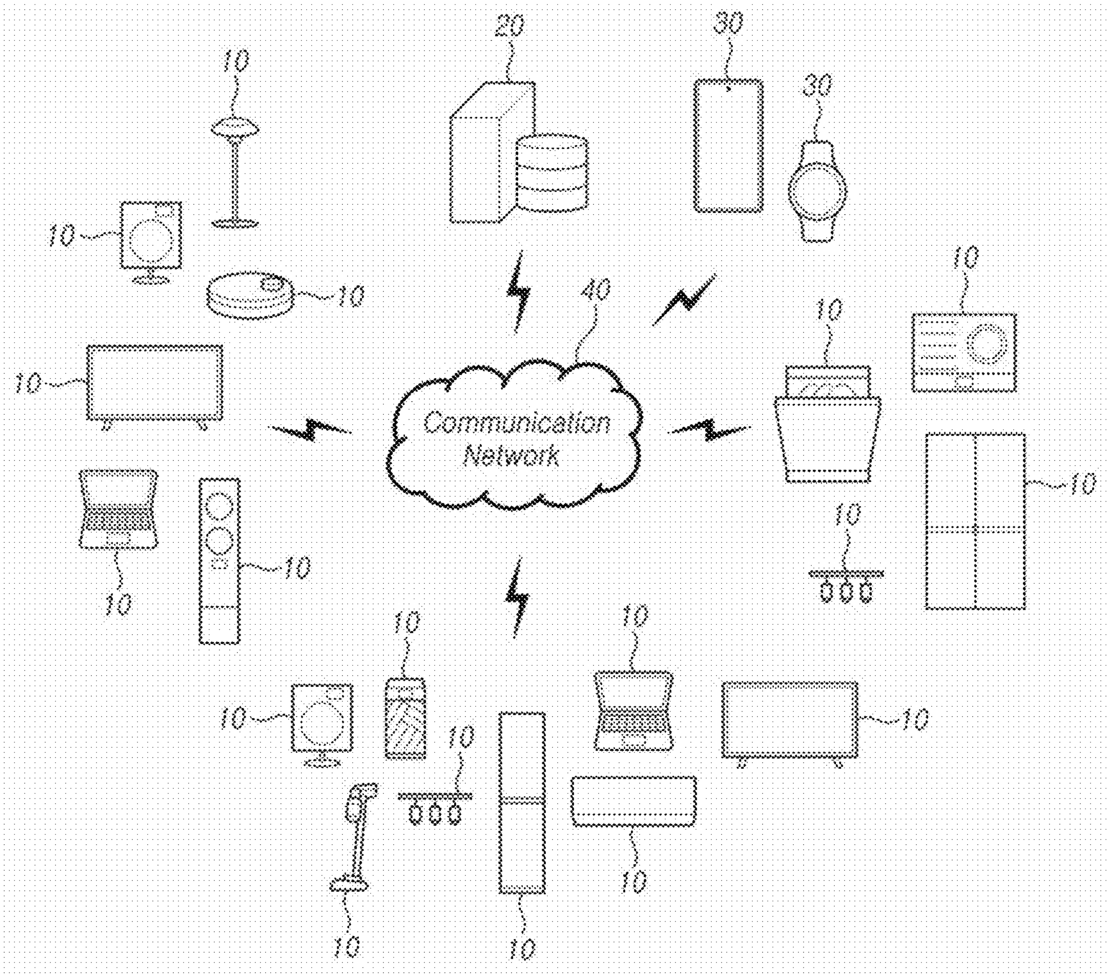
FIG. 1 is a view schematically illustrating an example system environment in which space-specific power-saving management of electronic devices may be implemented according to one or more embodiments.

Hereinafter, embodiments of the disclosure are described in detail with reference to the accompanying drawings. In the following description, specific details, such as detailed configurations and components, will be provided merely for a better understanding of embodiments of the disclosure. The same or similar reference denotations may be used to refer to the same or similar elements throughout the specification and the drawings. Further, for clarity and brevity, no description is made of well-known functions and configurations in the drawings and relevant descriptions.

FIG. 1 is a view schematically illustrating an example system environment in which space-specific power-saving management for electronic devices may be implemented according to one or more embodiments. As illustrated, various types of electronic devices 10, a managing device 20, and a user device 30 may be connected to communicate through a communication network 40.

In an embodiment, each electronic device 10 may include a communication module for communicating with another electronic device 10, the managing device 20, and/or the user device 30; a user interface configured to receive a user input or output information; at least one processor for controlling an operation of the electronic device 10; and at least one memory for storing a program for controlling the operation of the electronic device 10.

In an embodiment, each electronic device 10 may be one of various types of home appliances. For example, as illustrated in FIG. 1, the electronic device 10 may be one of a lighting lamp, a speaker, a TV, an air conditioner, a cleaning robot, a laptop computer, ceiling light, an air purifier, a cleaner, an electric range, a refrigerator, and a dishwasher, but is not limited thereto. For example, the electronic devices 10 may include various other types of home appliances such as a washing machine, a dryer, an electric oven, and the like, and other electronic devices. The above-mentioned electronic devices are merely examples, and the electronic devices 10 may include devices or equipment that are connected to other electronic devices, the managing device 20, and/or the user device 30 which consume a certain amount of power to perform (e.g., execute) operations described below, in addition to the above-mentioned home appliances.

In an embodiment, the electronic devices 10 may be electronic products disposed in a predetermined physical area (e.g., boundary or space), such as in the same home environment. In another embodiment, the electronic devices 10 may be electronic products disposed in two or more physical areas or space, e.g., a plurality of home environments, but the disclosure is not limited to a specific case.

Each electronic device 10 may obtain various pieces of information from another electronic device, the managing device 20, and/or the user device 30. The one or more electronic devices 10 may obtain a control command (e.g., a command for entering/releasing the power saving state) from another electronic device, the managing device 20, and/or the user device 30 and may perform (e.g., execute) an appropriate operation based on the obtained control command. The one or more electronic devices 10 may obtain information (e.g., a recipe or a washing method) related to a function of the corresponding electronic device 10 and various environmental information (e.g., weather, temperature, humidity, etc.) from another electronic device, the managing device 20, and/or the user device 30, and may provide the obtained information to the user through the provided user interface.

Each electronic device 10 may provide information about the operation or the state (e.g., operational state) of the electronic device 10 to the managing device 20. In an embodiment, the information provided from the electronic device 10 to the managing device 20 may include information (e.g., control input information from the user or information indicating absence of user interaction for at least a predetermined time period) related to a user interaction occurring in the corresponding electronic device 10, but the disclosure is not limited thereto. The information about the operation or the state (e.g., operational state) of the electronic device, provided from the electronic device 10 to the managing device 20, may be provided directly from the corresponding electronic device 10 to the managing device 20 through the communication network 40 or may be provided to the managing device 20 through another electronic device 10 and/or the user device 30. For example, each electronic device 10 may provide information about the operational state to the managing device 20 when a request is received from the managing device 20, when a specific event occurs in the corresponding electronic device 10 (e.g., when a user control input occurs), and/or periodically.

The managing device 20 may include a communication module for communicating with the electronic devices 10 and/or the user device 30, at least one processor for processing data received from the electronic devices 10 and/or the user device 30, and at least one memory for storing a program for processing data or processed data. In an embodiment, the managing device 20 may be a computer device disposed in the home environment in which the electronic devices 10 are provided. In another embodiment, the managing device 20 may be a server device disposed inside and/or outside the home environment in which the electronic devices 10 are provided. In an embodiment, the managing device 20 may be a server device implemented as various computer devices such as a workstation, a cloud, a data drive, and a data station, but the disclosure is not limited thereto. In an embodiment, the managing device 20 may be implemented as one or more computer devices, physically or logically divided based on a function, a detailed configuration of the function, data, or the like, and may transmit and receive data and process the transmitted and received data through communication between the computer devices.

In an embodiment, the managing device 20 may register and manage one or more user accounts. In an embodiment, the managing device 20 may register and manage each of the one or more electronic devices 10. In an embodiment, the managing device 20 may register and manage each of the one or more user devices 30. In an embodiment, the managing device 20 may register and manage the one or more electronic devices 10 and the one or more user devices 30 in association with a predetermined user account. In an embodiment, the managing device 20 may register and manage identification information (e.g., a serial number or a MAC address) about each electronic device 10 in association with a corresponding user account.

In an embodiment, the managing device 20 may store identification information about each electronic device 10 and identification information regarding the space where the corresponding electronic device 10 is provided. In an embodiment, the identification information about one or more electronic devices 10 provided (e.g., present) in the same space (e.g., the same living room or the same bedroom) may be grouped, stored, and managed by the same space identification information corresponding thereto.

In an embodiment, the managing device 20 may group one or more electronic devices 10 into a predetermined group, e.g., an absence estimation group, and store and manage the group, in order to implement the space-specific power-saving management. In an embodiment, the one or more electronic devices 10 may be grouped into an absence estimation group based on a system setting or a user setting. In an embodiment, the operation of grouping one or more electronic devices 10 into an absence estimation group may be dynamically performed on the system based on user activity information accumulated over time. In an embodiment, in case that there is user's predetermined interaction for an electronic device 10 (e.g., an interaction to turn off the corresponding electronic device 10 or lower the operation activity level of the device), if it can be assumed, according to the operation characteristics of the electronic device 10, that the user was present in the space where the electronic device 10 is provided, leaves the space and is no longer in the space, the electronic device 10 may be included in the absence estimation group, but the disclosure is not limited thereto. The managing device 20 may store identification information about the electronic devices 10 classified as the absence estimation group together with information indicating that the electronic devices 10 are included in the absence estimation group.

For example, if the operation of the electronic device 10 causes a change in the overall environment of the provided space (e.g., an air conditioner that causes a change in temperature or a lighting lamp that causes a change in illuminance), the electronic device 10 may be classified as the absence estimation group. For example, if the operation of the electronic device 10 provides content (e.g., a TV or a speaker providing audio-visual content), the electronic device 10 may be classified as the absence estimation group. For example, if the operation of the electronic device 10 requires a continuous interaction with the user (e.g., a laptop computer, etc.), the electronic device 10 may be classified as the absence estimation group. Alternatively, e.g., if the operation of the electronic device 10 is composed of a single cycle according to the user control (e.g., a washing machine performing a washing cycle or a dryer performing a drying cycle), the electronic device 10 may be excluded from the absence estimation group. For example, if the electronic device 10 serves as a simple container (e.g., a refrigerator or a water purifier), the electronic device 10 may be excluded from the absence estimation group. The criteria for grouping into the absence estimation group described herein are merely examples, and the disclosure is not limited thereto.

In an embodiment, the managing device 20 may group one or more of the electronic devices 10 into a predetermined group, e.g., an occupancy estimation group, and store and manage the group, in order to implement the space-specific power-saving management. In an embodiment, the operation of grouping one or more of the electronic devices 10 into the occupancy estimation group may be based on the system setting or the user setting. In an embodiment, the grouping of one or more of the electronic devices 10 into the occupancy estimation group may be performed based on user activity information accumulated over time. In an embodiment, in case that a user's predetermined interaction for the electronic device 10 occurs (e.g., an interaction to turn on the electronic device 10 or increase the operation activity level of the device), if it can be assumed, according to an operation characteristic of the electronic device 10, that the user enters the space in which the electronic device 10 is provided and may be present for a relatively long time, the electronic device 10 may be included in the occupancy estimation group, but the disclosure is not limited thereto. The managing device 20 may store identification information about the electronic devices 10, classified as the occupancy estimation group, together with information indicating that the electronic devices 10 are included in the occupancy estimation group.

In an embodiment, the classification criterion for the absence estimation group and the classification criterion for the occupancy estimation group may be the same. In this case, the electronic device classified as the absence estimation group may be simultaneously classified as the occupancy estimation group. In another embodiment, the classification criterion for the absence estimation group and the classification criterion for the occupancy estimation group may be different from each other. In such a case, any electronic device classified as the absence estimation group may or may not belong to the occupancy estimation group, but the disclosure is not limited to a specific case. If the absence estimation group and the occupancy estimation group are the same, both the groups may be managed together as one.

Further, in the disclosure, it is mainly described that at least some of electronic devices 10 are selected and managed as the absence estimation group and/or the occupancy estimation group, but the disclosure is not limited thereto. In an embodiment, the managing device 20 may group one or more of the electronic devices 10 into another group, e.g., a power saving release group, and store and manage information regarding such a group. Similarly to the absence estimation group and/or the occupancy estimation group described above, the operation of grouping electronic device 10 into the power saving release group may be performed based on the system setting or the user setting, or may be performed based on user activity information accumulated over time. In a state where the absence of the user in a space where the electronic device 10 is provided was assumed so that the electronic device 10 in the space has been set to the power saving state or the power saving standby state to be described below, when a predetermined interaction (e.g., an interaction to turn on the electronic device 10 or increase the operation activity level of the electronic device 10) of the user for the corresponding electronic device 10 occurs, if it can be assumed that the user returns to and is present in the space, the electronic device 10 may be included in the power saving release group, but the disclosure is not limited thereto. The power saving release group may grouped and managed together with the above-described occupancy estimation group or may be grouped and managed separately from the occupancy estimation group.

The managing device 20 may store operation or state (e.g., operational state) information about each electronic device 10. For example, for each electronic device 10, the managing device may store information indicating whether the corresponding electronic device is currently in a power saving standby state, a power saving state, or the like. If an electronic device 10 is in a power saving state, the managing device 20 may store state information (e.g., various operation settings) at the time when the corresponding electronic device 10 enters the power saving state.

The managing device 20 may obtain operation or state information about each electronic device 10 (e.g., user input generation information about power-on/off, user input generation information about increasing or decreasing operation activity level of the device, and/or information indicating the inactive state of user interaction) through the communication network 40. The managing device 20 may obtain, e.g., information about the operation or the state of a specific electronic device 10 directly from the corresponding electronic device 10 or via another electronic device or the user device 30.

The managing device 20 may determine whether to change the states (e.g., operational states) of the related electronic devices 10, based on the obtained operation or state information about the electronic devices 10. For example, the managing device 20 may determine whether to allow the related electronic devices 10 to enter/release the power saving standby state or the power saving state based on the operation or state information obtained regarding the electronic device 10. The managing device 20 may update information stored in the corresponding electronic devices 10 after determination is made to change the state of the electronic devices 10. The managing device 20 may generate and transmit a control command for the corresponding electronic devices 10 after determination is made to change the state of the electronic devices 10. In an embodiment, if determination is made to allow the one or more electronic devices 10 to enter/release from the power saving state, the managing device 20 may update the stored information indicating the state of the corresponding electronic device 10 and may generate and transmit a control command for allowing the corresponding electronic device 10 to enter/release from the power saving state.

The user device 30 may be a terminal device capable of communicating with the electronic devices 10 and/or the managing device 20 through the communication network 40. The user device 30 may include a communication module, a user interface receiving a user input or outputting information to the user, at least one processor controlling the operation of the user device 30, and at least one memory storing a program for controlling the operation of the user device 30. The user device 30 may mobile (e.g., portable or moveable) or may be fixedly disposed in a desired space. The user device 30 may be, e.g., a mobile phone or a wearable device as illustrated in FIG. 1, but the disclosure is not limited thereto. In an embodiment, the user device 30 may include a personal computer or any portable terminal, but the disclosure is not limited to a specific case.

An application, associated with controlling at least one electronic device 10, may be stored in the memory of the user device 30. The application may be originally installed on the user device 30 or may be downloaded from an external server. In an embodiment, the user may access the managing device 20 through an application installed on the user device 30. In the embodiment, the user may access the managing device 20 through the application of the user device 30 to generate a user account. In an embodiment, the user may access the managing device 20 through the application of the user device 30 and register the user account in association with the user device 30.

In an embodiment, each electronic device 10 may register with the managing device 20 through the application of the user device 30. For example, each electronic device 10 may access the managing device 20 through the application of the user device 30, and the managing device 20 may register its own identification information (e.g., the serial number or the media access control (MAC) address) in association with the corresponding user account.

The user may input one or more settings for space-specific power-saving management through the application installed in the user device 30. Each setting input from the user may be transmitted to the managing device 20. The managing device 20 may control the electronic devices 10 for space-specific power-saving management, based on each setting obtained through the user device 30.

The user device 30 may be used to control the operation or the state of one or more electronic devices 10. In an embodiment, an operation or state control command for the at least one electronic device 10 may be obtained and transmitted from the user through the application installed on the user device 30. In an embodiment, an operation or state control command for the at least one electronic device 10 may be obtained and transmitted from the managing device 20 through the application installed on the user device 30. In an embodiment, through the application installed on the user device 30, an approval request message, associated with an operation or state control for the at least one electronic device 10, may be obtained and displayed from the managing device 20, and an input from the user in response thereto may be obtained and transmitted. For example, in relation to space-specific power-saving management, if a determination is made at/by the managing device 20 to allow the at least one electronic device 10 to enter the power saving state, the user approval request message regarding the determination may be obtained and displayed on the user device 20 from the managing device 20. If the approval from the user is obtained from the user device 20, such information may be transmitted to the managing device 20 and/or the corresponding electronic device 10.

The communication network 40 may include both a wired and a wireless communication network. The wired communication network may include a cable network or a telephone network. The wireless communication network may include all networks that transmit and receive signals through radio waves. The wired communication network and the wireless communication network may be connected to each other.

The communication network 40 may include a wide area network (WAN) such as the Internet, a local area network (LAN) formed around an access point (AP), and/or a short-range wireless network that does not pass through the AP. The short-range wireless network may include, but is not limited to, Bluetooth™ (IEEE 802.15.1), Zigbee (IEEE 802.15.4), wireless-fidelity (Wi-Fi) direct, near-field communication (NFC), and Z-wave.

In an embodiment, the electronic devices 10 may be connected to the managing device 20 and/or the user device 30 through a long-range wireless network and/or a short-range wireless network. For example, the electronic devices 10 may be connected to the user device 30 through a short-range wireless network. For example, the electronic devices 10 may be connected to the managing device 20 and/or the user device 30 through a long-range wireless network (e.g., a cellular communication module). For example, the electronic devices 10 may access the WAN using a wired network, and may be connected to the managing device 20 and/or the user device 30 through the WAN.

In an embodiment, the communication network 40 may include the AP for connecting the electronic devices 10, the managing device 20, and/or the user device 30, but the disclosure is not limited thereto. In an embodiment, the managing device 20 may be connected to the WAN, and the electronic devices 10 and the user device 30 may be connected to the managing device 20 through the AP and the WAN. The AP may communicate with the electronic device 10, the managing device 20, and/or the user device 30 using wireless communication such as Wi-Fi™ (IEEE 802.11), Bluetooth™ (IEEE 802.15.1), Zigbee (IEEE 802.15.4), and access the WAN using wired communication, but the disclosure is not limited thereto.

In an embodiment, any electronic device 10 may access the WAN using wired communication and may operate as an access point for other electronic devices. In this case, other electronic devices may be connected to the WAN through the corresponding electronic device 10.

Figure 2:
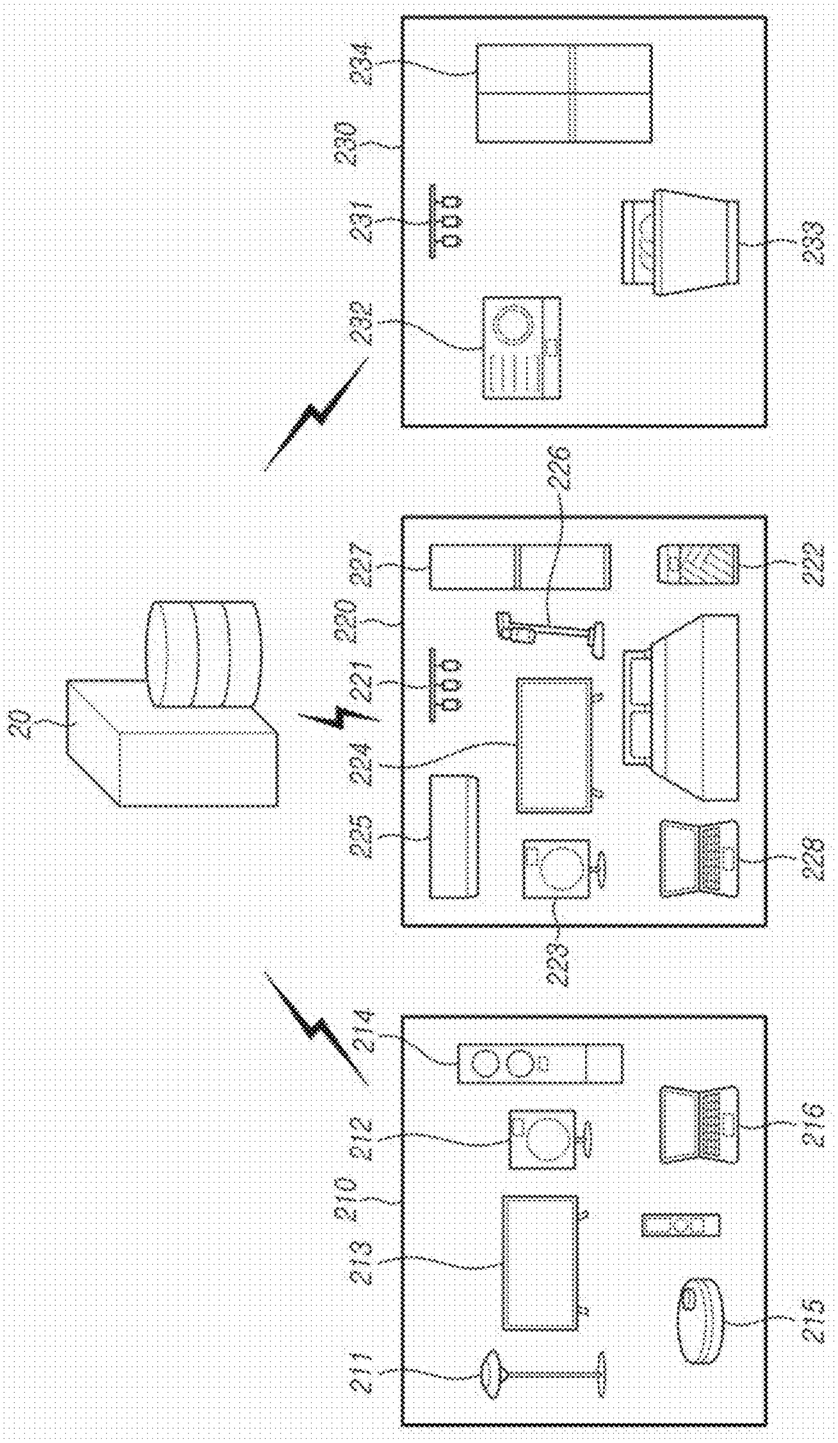
FIG. 2 is a view schematically illustrating an example device arrangement for each space of a home according to one or more embodiments.

FIG. 2 is a view schematically illustrating an example device arrangement for each home space according to one or more embodiments. As illustrated, the indoor environment may be divided into three (3) spaces, e.g., a living room 210, a bedroom 220, and a kitchen 230, but the disclosure is not limited thereto.

In an embodiment, a plurality of electronic devices, e.g., a lighting lamp 211, a speaker 212, a TV 213, an air conditioner 214, a cleaning robot 215, and a laptop computer 216, are disposed in the living room 210. The identification information about each of the electronic devices (211 to 216) may be classified as being provided in the living room 210, which is the same space, and may be stored in the managing device 20.

In an embodiment, a plurality of electronic devices, e.g., a ceiling light 221, an air purifier 222, a speaker 223, a TV 224, an air conditioner 225, a cleaner 226, a clothes care device 227, and a laptop computer 228, are disposed in the bedroom 220. The identification information about each of the electronic devices 221 to 228 may be classified as being provided (e.g., present) in the bedroom 220, which is the same space, and may be stored in the managing device 20.

In an embodiment, a plurality of electronic devices, e.g., a ceiling light 231, an electric range 232, a dishwasher 233, and a refrigerator 234, are disposed in the kitchen 230. The identification information about each of the electronic devices (231 to 234) may be classified as being provided (e.g., present) in the kitchen 230, which is the same space, and may be stored in the managing device 20.

In an embodiment, the managing device 20 may control the plurality of electronic devices provided in any one of the living room 210, the bedroom 220, and the kitchen 230 to enter/release the power saving state.

FIG. 3 is a view schematically illustrating an example database configuration that may be used for space-specific power-saving management according to one or more embodiments. For example, FIG. 3 illustrates an exemplary database configuration corresponding to the home environment illustrated in FIG. 2. In an embodiment, the database 300 may be stored and/or managed by the managing device 20.

In an embodiment, as illustrated, the identification information 302 and type information, about each electronic device provided (e.g., present) in the corresponding space, may be grouped and stored in the database 300 for each piece of the identification information 301. For example, the group 310 corresponding to the living room space includes information about six (6) electronic devices. For example, the group 320 corresponding to the bedroom space includes information about seven (7) electronic devices. For example, the group 330 corresponding to the kitchen space includes information about four (4) electronic devices.

In an embodiment, as illustrated, the database 300 may include a field 304 for setting (e.g., determining) whether a corresponding electronic device corresponds to the absence estimation group for each electronic device. In an embodiment, the absence estimation group may include predetermined devices for which the user's predetermined interaction (e.g., a predetermined interaction to off the electronic device or decrease the operation activity level of the device) for the corresponding electronic device may bring about power saving of the space where the corresponding electronic device is installed according to later conditions (e.g., status). As described above, whether an electronic device belongs to the absence estimation group may be determined based on the system setting or the user setting or based on accumulated user activity information. For example, in case that there is a user interaction with any electronic device, if it is possible to assume (e.g., determine) that the user in a space where the electronic device is provided, has left the space, the electronic device may be included in the absence estimation group, but the disclosure is not limited thereto. According to an embodiment of the disclosure, among the electronic devices provided in the living room space, the lighting lamp, the TV, the air conditioner, and the laptop computer may belong to the absence estimation group, but the disclosure is not limited thereto. For example, as illustrated, the ceiling light. TV, and air conditioner among the electronic devices provided in the bedroom space may belong to the absence estimation group, but the disclosure is not limited thereto. According to an embodiment of the disclosure, as illustrated, among the electronic devices provided in the kitchen space, the ceiling light and the electric range may belong to the absence estimation group, but the disclosure is not limited thereto. In the drawings, it is illustrated that even for the same type of electronic device (e.g., a laptop computer), a setting related to whether it is included in the absence estimation group for each space (i.e., the laptop computer in the living room space is set to be included in the absence estimation group while the laptop computer in the bedroom space is set not to be included) may be different, but the disclosure is not limited thereto. In an embodiment, whether to be included in the absence estimation group may be determined according to the device type, but the disclosure is not limited to a specific type.

In an embodiment, as illustrated, the database 300 may include a field 305 for setting (e.g., determining) whether a corresponding electronic device corresponds to the occupancy estimation group for each electronic device. As described above, the occupancy estimation group may include predetermined devices for which the user's predetermined interaction (which may be, e.g., a predetermined interaction to turn on the electronic device or increase the operation activity level of the device) for the corresponding electronic device may bring about power saving of the electronic devices provided in another space. As described above, whether an electronic device belongs to the occupancy estimation group may be determined based on the system setting or the user setting or based on accumulated user activity information. For example, in case that there is a user interaction with any electronic device, if it can be assumed (e.g., determined) that the user enters the space, in which the electronic device is provided, and stays in the space for a certain extended period of time, the electronic device may be included in the occupancy estimation group. According to the embodiment, among the electronic devices provided in the living room space, the lighting lamp, the speaker, the TV, the air conditioner, and the laptop computer may belong to the estimated occupancy group, but the disclosure is not limited thereto. According to an embodiment, among the electronic devices provided in the bedroom space, ceiling light, the air purifier, the speaker, the TV, and the air conditioner may belong to the estimated occupancy group, but the disclosure is not limited thereto. According to an embodiment, as illustrated, among the electronic devices provided in the kitchen space, the ceiling light and the electric range may belong to the estimated occupancy group, but the disclosure is not limited thereto. In the drawings, it is illustrated that even for the same type of electronic device (e.g., a laptop computer), a setting related to whether it is included in the occupancy estimation group for each space (i.e., the laptop computer in the living room space is set to be included in the occupancy estimation group while the laptop computer in the bedroom space is set not to be included) may be different, but the disclosure is not limited thereto. In an embodiment, whether to be included in the occupancy estimation group may be determined according to the device type, but the disclosure is not limited to a specific type.

As illustrated in the drawings, information regarding whether each electronic device belongs to the absence estimation group and whether each electronic device belongs to the occupancy estimation group is individually set. For example, it is illustrated that the speaker positioned in the living room does not belong to the absence estimation group but does belong to the occupancy estimation group. For example, although the user's interaction (e.g., input or instruction) to turn off the speaker in the living room space would not likely be considered (or interpreted) as the user being absent from the space, the user's interaction to turn on the speaker in the bedroom space would likely be considered (e.g., seen) as the user entering and/or being present in the space for a relatively long time. For example, it is illustrated that the air purifier and the speaker positioned in the bedroom do not belong to the absence estimation group but does belong to the occupancy estimation group. For example, although the user's interaction (e.g., instruction) to turn off the air purifier or speaker in the bedroom space would not likely be considered that the user has exited the space, the user's interaction (e.g., instruction) to turn on the air purifier or speaker in the bedroom space has a high chance of it being considered that the user is in the space and may stay for a relatively long time. In another embodiment, one electronic device may or may not be commonly included in the absence estimation group and the occupancy estimation group, but the disclosure is not limited to a specific form.

As illustrated in the drawings, the two (2) groups, the absence estimation group and the occupancy estimation group, are formed and managed by some of the electronic devices. However, as described above, in another embodiment, a separate power saving release group may be formed and managed by at least some of the electronic devices, but the disclosure is not limited to a specific case.

In an embodiment, as illustrated, the database 300 may include a field 306 indicating whether each electronic device is in the power saving standby state, and a field 307 indicating whether each electronic device is in the power saving state. According to space-specific power-saving management, a group of electronic devices corresponding to any one space may enter the power saving standby state or the power saving state, and in such a case, information indicating that each electronic device corresponding to the corresponding space is currently in the power saving standby state or the power saving state may be included in each field (306 or 307) of the database 300. As illustrated in the field 306 of FIG. 3, the electronic devices belonging to the group 310, corresponding to the living room space, are currently in the power saving standby state. As illustrated in the field 308 of FIG. 3, there are no electronic devices currently in the power saving state.

In an embodiment, the database 300 may also include a field 308 for storing operation or state information (e.g., various settings at the time of entering the power saving state) of the corresponding device immediately before entering the power saving state for each of the electronic devices in the power saving state. Referring to FIG. 3, the field 307 indicates that there is no electronic device currently in the power saving state, and accordingly, information corresponding to the field 308 is not shown. At any time electronic devices, corresponding to any one space, enter the power saving state, information corresponding thereto may be stored in the field 307 and the field 308.

Figure 4:
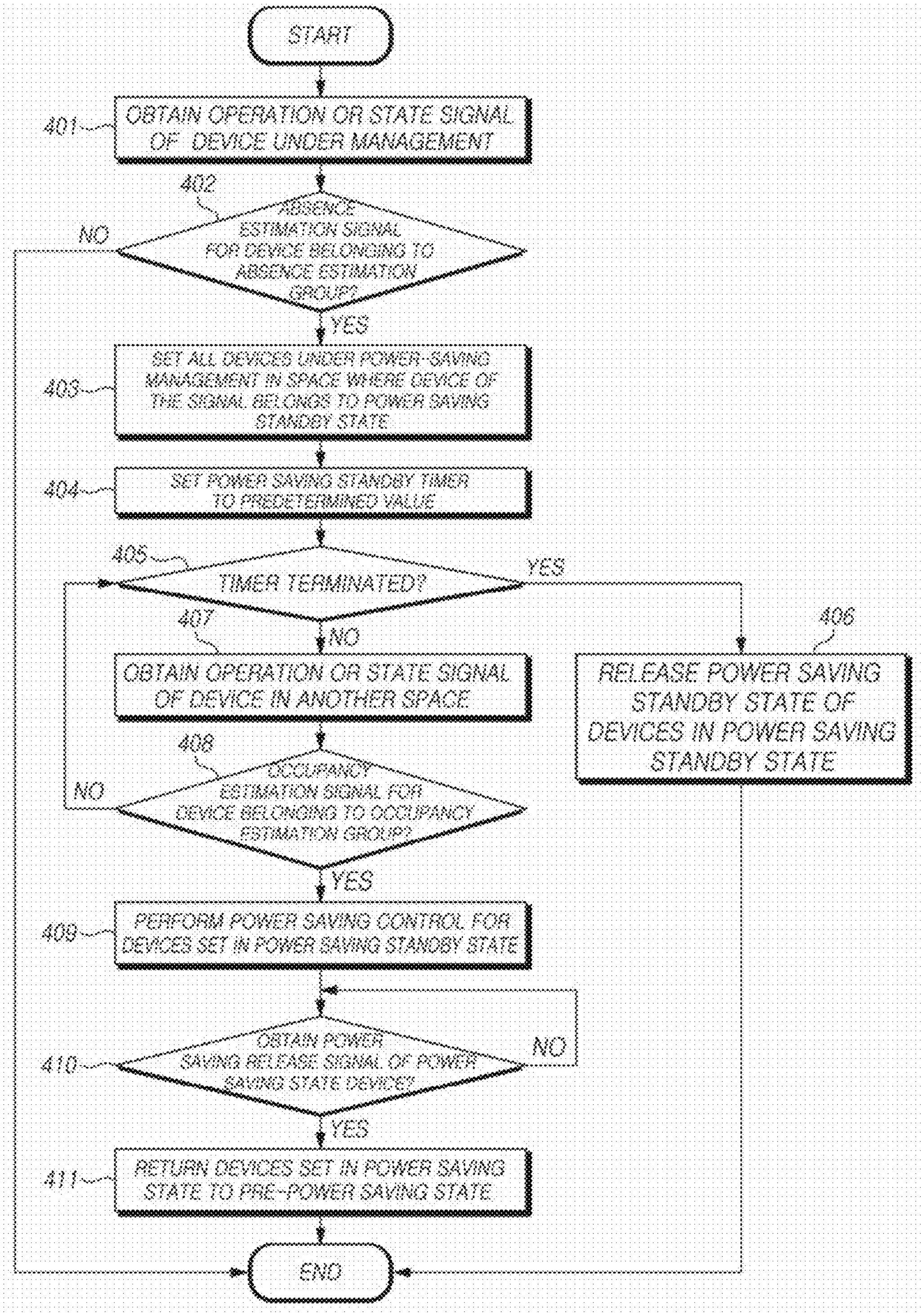
FIG. 4 is a flowchart schematically illustrating an example overall procedure related to performing space-specific power-saving management for electronic devices according to one or more embodiments.

FIG. 4 is a flowchart schematically illustrating an example overall procedure related to performing space-specific power-saving management for electronic devices according to one or more embodiments. In an embodiment, the operations illustrated in FIG. 4 may be performed by the managing device 20. In the embodiment illustrated in FIG. 4, to assist with understanding, the question of whether there is an existing electronic device that is already in the power saving standby state or the power saving state before the procedure is started is not considered.

As illustrated in the drawings, in operation 401, an operation or a state signal regarding any electronic device subject to space-specific power-saving management according to an embodiment may be obtained. In operation 402, it may be determined whether the obtained signal is a predetermined member estimation signal for the device belonging to the absence estimation group. For example, the electronic device related to the obtained signal may be a device classified into the absence estimation group described above. For example, the obtained signal may be a predetermined absence estimation signal for a corresponding electronic device. In an embodiment, the absence estimation signal may be a predetermined type of signal predetermined by the user or a system setting. In an embodiment, the absence estimation signal may be a user control (e.g., command) input signal to turn off the corresponding electronic device or decrease the operation activity level (e.g., a control input signal for raising the cooling setting temperature of the air conditioner to at least a reference value, a control input signal for lowering the illuminance of the lighting lamp to at most a reference value), or a signal for indicating that the state of stopping the user interaction for the corresponding electronic device lasts for at least a predetermined time (e.g., a signal for indicating that the screen saver has started to operate on TV or laptop computer due to the absence of the user's long-term interaction), but the disclosure is not limited thereto.

If it is determined that the signal obtained in operation 402 is an absence estimation signal for a device belonging to the absence estimation group, the procedure proceeds to operation 403, and the space, in which the device belongs, may be set as a power saving standby space, and all electronic devices subject to space-specific power-saving management in that space may be set to the power saving standby state. For example, the managing device 20 may set the power saving standby state display in the database 30 in relation to electronic devices in the space to which the electronic device belongs. In an embodiment, if the electronic device 10 is set to the power saving standby state, the operational state of each corresponding electronic device itself is not changed, but the database 30 information corresponding thereto may be updated. Subsequently, in operation 404, a power saving standby timer may be set to a predetermined value (e.g., five (5) minutes).

In operation 405, it may be determined whether the power saving standby timer is terminated. If the power saving standby timer is terminated in operation 405, the procedure may proceed to operation 406 in which the electronic devices are released from the power saving standby state and the procedure is terminated.

If the power saving standby timer is not terminated in operation 405, the procedure proceeds to operation 407 in which an operation or state signal of other electronic device (s) in a space different from the power saving standby space may be obtained. Next, in operation 408, a determination is made as to whether the obtained signal is a predetermined occupancy estimation signal for a device belonging to the occupancy estimation group. For example, the electronic device, related to the obtained signal, may be a device classified into the occupancy estimation group. For example, the obtained signal may be a predetermined occupancy estimation signal for the corresponding electronic device. In an embodiment, the occupancy estimation signal may be a predetermined type of signal predetermined (e.g., selected) by the user, system setting, or the like. In an embodiment, the occupancy estimation signal may be a user control input signal for turning on the corresponding electronic device or increasing the operation activity level (e.g., a control input signal for lowering the cooling setting temperature of the air conditioner, a control input signal for increasing the illuminance of the lighting lamp, a signal for indicating that the screen saver is stopped according to the occurrence of a user input on TV or laptop computer), but the disclosure is not limited thereto.

In operation 408, if the obtained signal is not an occupancy estimation signal for the device of the occupancy estimation group, the procedure may return to operation 405. If the obtained signal is an occupancy estimation signal for the device of the occupancy estimation group in operation 408, the procedure may proceed to operation 409 in which all electronic devices, that are in the power saving standby state previously set in the power saving standby space, may be set to the power saving state, and a power saving control operation for the corresponding devices may be performed. According to an embodiment, in operation 409, the current state of each of the electronic devices in the power saving standby state of the power saving standby space may be stored, and a control command for allowing each corresponding electronic device to enter the power saving state may be generated and transmitted. For example, the managing device 20 may store pre-power saving state (state before power saving) information corresponding to each of the corresponding electronic devices in the database 30 and transmit a control command for allowing each electronic device to enter the power saving state. In an embodiment, each electronic device receiving a control command for providing permission to enter the power saving state may enter a predetermined power saving mode (e.g., any predetermined setting mode to reduce power consumption, such as turning off device power, entering an AI saving mode, setting lighting illuminance to a predetermined low value, screen off, setting air conditioner cooling setting temperature to a predetermined high temperature) on the corresponding device.

Thereafter, in operation 410, it may be determined whether a power saving release signal, related to the electronic device 10 in the power saving state, is obtained. In an embodiment, the power saving release signal may be a predetermined type of user control input signal for an electronic device in the power saving state. In an embodiment, the power saving release signal may be a predetermined user control input signal generated for the electronic device belonging to the power saving release group among the electronic devices in the power saving state. In the embodiment, the power saving release signal may be a predetermined user control input signal generated for the electronic device 10 belonging to the power saving release group among the electronic devices in the power saving state to turn on the corresponding device or to increase the operation activity level, but the disclosure is not limited to a specific embodiment. If the power saving release signal is obtained in operation 410, the procedure may proceed to operation 411 and may perform the operation of returning (e.g., entering) all the electronic devices in the power saving state of the corresponding power saving space to the pre-power saving state. In an embodiment, the managing device 20 may generate and transmit a control command for releasing power saving of each electronic device using the current state information about each electronic device stored previously in the database 30 at the time of entering the power saving state.

Figure 5:
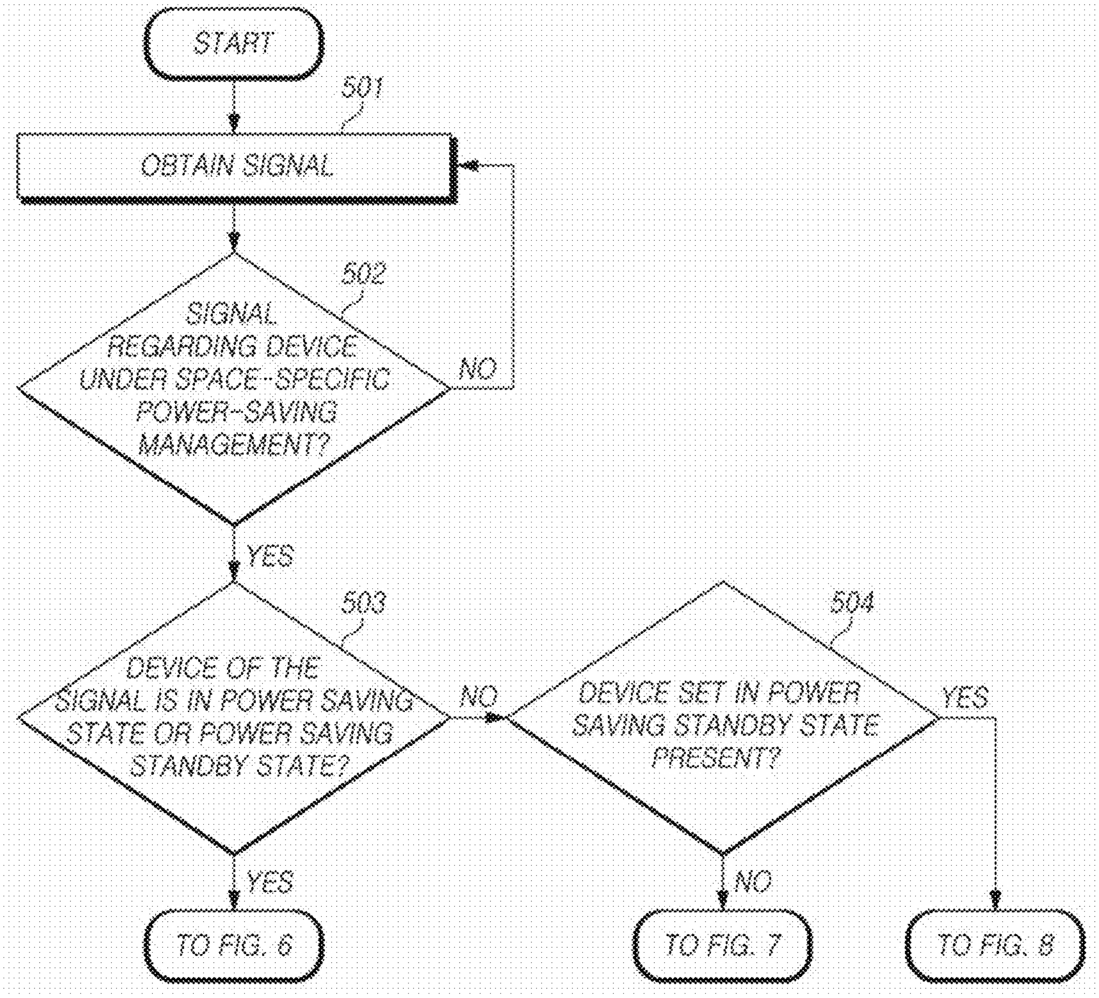
FIG. 5 is a flowchart schematically illustrating an example overall procedure related to performing space-specific power-saving management for electronic devices according to one or more embodiments.

FIG. 5 is a flowchart schematically illustrating an example overall procedure related to performing space-specific power-saving management for electronic devices according to one or more embodiments. In the embodiment illustrated in FIG. 5, different from FIG. 4, a consideration is made as to whether there is any electronic device already in the power saving standby state or the power saving state before the start of the procedure.

Figure 7:
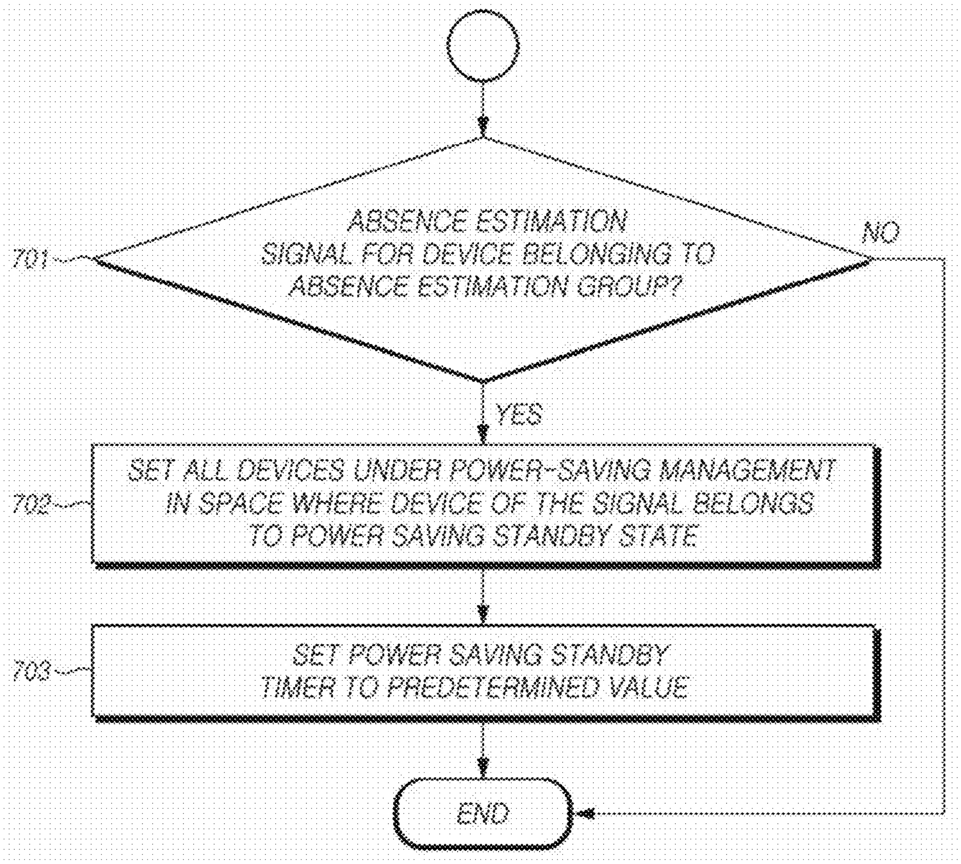
FIG. 7 is a flowchart schematically illustrating an example procedure related to setting electronic devices to a power saving standby state according to one or more embodiments.

FIG. 6 is a flowchart schematically illustrating an example procedure related to releasing the power saving state or the power saving standby state for electronic devices in the power saving state or the power saving standby state according to one or more embodiments. FIG. 7 is a flowchart schematically illustrating an example procedure related to setting electronic devices to a power saving standby state according to one or more embodiments. FIG. 8 is a flowchart schematically illustrating an example procedure related to setting electronic devices from a power saving standby state to a power saving state according to one or more embodiments. Hereinafter, a space-specific power-saving management operation, according to an embodiment, is described with reference to FIGS. 5 to 8. The following description made with reference to FIGS. 5 to 8 is merely an example, and the disclosure is not limited thereto. In an embodiment, the operation flow illustrated in FIGS. 5 to 8 may be performed by the above-described managing device 20.

First, referring to FIG. 5, a signal may be obtained in operation 501, and it may be determined in operation 502 whether the obtained signal is a signal related to electronic devices 10 set as subject to space-specific power-saving management.

If it is determined in operation 502 that the obtained signal is the signal related to the electronic device 10 subject to space-specific power-saving management, the procedure proceeds to operation 503. In operation 503, it may be determined whether the corresponding electronic device 10 is currently set to the power saving state or the power saving standby state. In the embodiment, the managing device 20 may determine the setting state of the corresponding electronic device with reference to the database 300 of FIG. 3. In operation 503, if it is determined that the corresponding electronic device is in the power saving or power saving standby state, the procedure may proceed to FIG. 6.

Referring to FIG. 6, in operation 601, it may be determined whether the electronic device 10, corresponding to the obtained signal, is in the power saving state, and in such a case, the procedure may proceed to operation 602. According to an embodiment, in operation 602, it may be determined whether the electronic device belongs to the occupancy estimation group and whether the corresponding signal belongs to the occupancy estimation signal. For example, the managing device 20 may determine whether the electronic device, which is currently in the power saving state, belongs to the occupancy estimation group and whether the corresponding signal is an occupancy estimation signal (e.g., a turn-on signal or a predetermined signal for increasing the operation activity level of the device). If it is determined in operation 602 that the obtained signal is the occupancy estimation signal for the device of the occupancy estimation group, the procedure may proceed to operation 603 to release the power saving state for the electronic devices 10 in the space to which the corresponding device belongs and return (e.g., enter) the electronic devices to the pre-power saving state. For example, the managing device 20 may generate and transmit a command for returning each electronic device to the pre-power saving state, using information stored in the database 30 in relation to each corresponding electronic device, i.e., power saving state information.

If it is determined in operation 601 that the electronic device corresponding to the obtained signal is not in the power saving state, the corresponding electronic device may be regarded as being in the power saving standby state. In operation 604, it may be determined whether the power saving standby timer is terminated, and when the power saving standby timer is terminated, in operation 607, all the electronic devices in the corresponding space may be released from the power saving standby state. If the power saving standby timer is not terminated in operation 604, the procedure may proceed to operation 605. According to an embodiment, in operation 605, it may be determined whether the electronic device currently in the power saving standby state belongs to the occupancy estimation group and whether the corresponding signal is a predetermined occupancy estimation signal (e.g., a turn-on signal or a predetermined signal for increasing the activity level of the device). In operation 605, if the obtained signal is an occupancy estimation signal for the electronic device of the occupancy estimation group, the procedure proceeds to operation 606, and the power saving standby timer for the electronic devices in the space to which the electronic device belongs may be released, and the electronic devices may be released from the power saving standby state in operation 607. For example, the managing device 20 may change the indication of whether the electronic device is in the power saving standby state for the devices in the power saving standby state in the space to which the electronic device belongs, in the database 30. Alternatively, in operation 605, if the obtained signal is not the occupancy estimation signal for the device of the occupancy estimation group, the procedure may proceed to operation 608 to reset the power saving standby timer to extend the standby time.

In the embodiment illustrated in FIG. 6, depending on information regarding whether the electronic device in the power saving state or the power saving standby state belongs to the occupancy estimation group and a predetermined occupancy estimation signal for the electronic device is obtained, the power saving state or the power saving standby state of the electronic devices in the space to which the electronic device belongs is released. In this embodiment, the above-described power saving release group (and power saving release signal) is used to overlap the occupancy estimation group (and the occupancy estimation signal) instead of being separately managed. According to another embodiment, some of the electronic devices may be classified and managed as the absence estimation group or the occupancy estimation group, and some of the electronic devices may be classified and managed as another group, i.e., the power saving release group, and the type of the power saving release signal for releasing the power saving state or the power saving standby state may be predetermined in relation to the electronic devices of the power saving release group. In such a case, in operation 602 and operation 605, it may be determined whether the electronic device corresponding to the obtained signal belongs to the power saving release group and whether the corresponding signal belongs to a signal type leading to power saving release.

Referring back to FIG. 5, in operation 503, if the electronic device corresponding to the obtained signal is not in the power saving state or the power saving standby state, the procedure proceeds to operation 504, and it may be determined whether there is an electronic device currently set to the power saving standby state. In operation 504, if the electronic device set to the power saving standby state is not present, the procedure may proceed to FIG. 7 to perform the operation of setting one or more electronic devices to the power saving standby state according to conditions.

Referring to FIG. 7, in operation 701, it may be determined whether the electronic device 10 corresponding to the obtained signal belongs to the absence estimation group and whether the corresponding signal belongs to the absence estimation signal. In operation 701, if the obtained signal is an absence estimation signal for the device of the absence estimation group, the procedure proceeds to operation 702, and all the electronic devices subject to space-specific power-saving management of the space to which the corresponding electronic device 10 belongs may be set to the power saving standby state. Subsequently, in operation 703, a power saving standby timer may be set to a predetermined value (e.g., five (5) minutes).

Referring back to FIG. 5, in operation 504, if the electronic device, currently set to the power saving standby state, is present, the procedure may proceed to FIG. 8 to perform an appropriate power saving control operation for the electronic devices in the power saving standby state according to the condition.

Referring to FIG. 8, in operation 801, it may be determined whether the power saving standby timer, corresponding to the electronic device currently set to the power saving standby state, is terminated. If the power saving standby timer is terminated in operation 801, the procedure may proceed to operation 802 to release the electronic devices set to the power saving standby state from the power saving standby state and terminate the procedure.

If the power saving standby timer is not terminated in operation 801, the procedure proceeds to operation 803, and it may be determined whether the electronic device corresponding to the obtained signal belongs to the occupancy estimation group and whether the corresponding signal belongs to the occupancy estimation signal. For example, the managing device 20 may determine whether the corresponding electronic device belongs to the occupancy estimation group and whether the corresponding signal is an occupancy estimation signal (e.g., a turn-on signal or a predetermined signal for increasing the operation activity level of the device). In operation 803, if the obtained signal is an occupancy estimation signal for the device of the occupancy estimation group, the procedure proceeds to operation 804, and all the electronic devices subject to space-specific power-saving management in the space to which the corresponding device currently set to the power saving standby state belongs may be changed to the power saving state. Then, the procedure proceeds to operation 805, and the current state of each of the electronic devices set to the power saving state may be stored, and a power saving control command for the electronic devices may be generated and transmitted.

In operation 803, if the obtained signal is not the occupancy estimation signal for the device of the occupancy estimation group, the procedure may proceed to operation 806, and the existing power saving standby timer may be reset to a predetermined value (e.g., five (5) minutes), and the procedure may be terminated.

Figure 9:
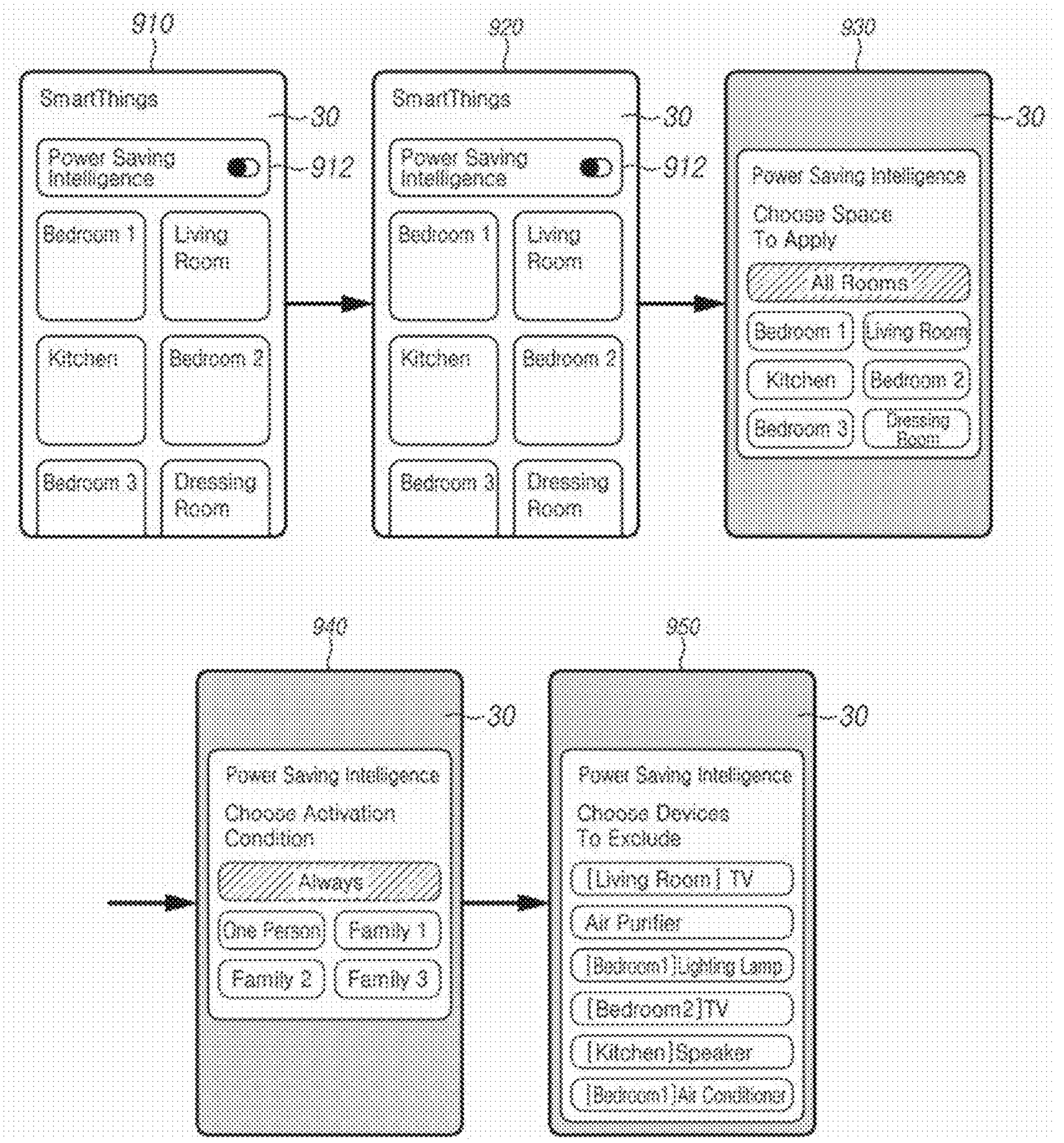
FIG. 9 is a view schematically illustrating example user interface screens showing a user setting process of space-specific power-saving management according to one or more embodiments.

FIG. 9 is a view schematically illustrating example user interface screens showing a user setting process of space-specific power-saving management according to one or more embodiments.

According to an embodiment, the user may determine whether to apply the space-specific power-saving management control for each electronic device and each space registered in relation to the user account. In this regard, FIG. 9 sequentially illustrates example user interface screens that may be displayed on the user device 30 if the user setting regarding whether to apply the space-specific power-saving management control is performed through the user device 30.

First, on the screen 910, a selection item 912 for allowing the user to select whether to activate a space-specific power-saving management function is displayed at an upper end, and six (6) spaces registered (e.g., associated) with the corresponding user account, i.e., bedroom 1, a living room, a kitchen, bedroom 2, bedroom 3, and a dressing room, are displayed at a lower end. The screen 920 shows a state in which the upper selection item 912 is selected so that the user activates the space-specific power-saving management function.

The screen 930 shows a selection screen for determining whether to apply the space-specific power-saving management control for each of the spaces registered with the user account. As illustrated, the user has selected to apply the space-specific power-saving management control to all of the six spaces, but the disclosure is not limited thereto. The screen 940 shows a selection screen for the user to identify a number of people present in the entire space to determine whether to apply the space-specific power-saving management control. As illustrated, the user has selected to apply the space-specific power-saving management control regardless of the number of users, but the disclosure is not limited thereto. In another embodiment, the user may select to apply the space-specific power-saving management function when there is only one user.

The screen 950 shows a selection screen for allowing the user to select an electronic device to which space-specific power-saving management control is not to be applied from among the electronic devices registered with the user account. The user may select an electronic device to be excluded from the space-specific power-saving management control from the electronic device list displayed on the screen 950. In the electronic device selected on the screen 950, the operation or the state change occurring in the corresponding electronic device does not lead to the power saving standby state of the corresponding space or the power saving state of another space, nor does the corresponding device enter the power saving standby state or the power saving state based on the operation or the state change occurring another electronic device. As illustrated, on the screen 950, no device is excluded from space-specific power-saving management, but the disclosure is not limited thereto.

Hereinafter, example situations in which space-specific power-saving management is performed on electronic devices according to various embodiments is described with reference to FIGS. 10 to 19. Merely as an example, in the following description with reference to FIGS. 10 to 19, the space-specific power-saving management is performed in relation to three (3) spaces, including a living room (e.g., the living room 210 including the lighting lamp 211, the speaker 212, the TV 213, the air conditioner 214, the cleaning robot 215, and the laptop computer 216 of FIG. 2), a bedroom (e.g., the bedroom 220 including the ceiling light 221, the air purifier 222, the speaker 223, the TV 224, the air conditioner 225, the cleaner 226, the clothes care device 227, and the laptop computer 228 of FIG. 2), and a kitchen (e.g., the kitchen 230 including the ceiling light 231, the electric range 232, and the laptop computer 228 of FIG. 2), and all the electronic devices provided in each space are subject to space-specific power-saving management. Further, merely as an example, in the following description with reference to FIGS. 10 to 19, among the electronic devices provided in each space, the lighting lamp 211, the ceiling lights 221 and 231, the TVs 213 and 224, the air conditioners 214 and 225, the laptop computer 216 in the living room, and the electric range 232 are included in each of the absence estimation group and the occupancy estimation group. For example, in the following description with reference to FIGS. 10 to 19, among the electronic devices provided in each space, the speakers (212 and 223) and the air purifier 222 do not belong to the absence estimation group but belong to the occupancy estimation group.

Figure 10:
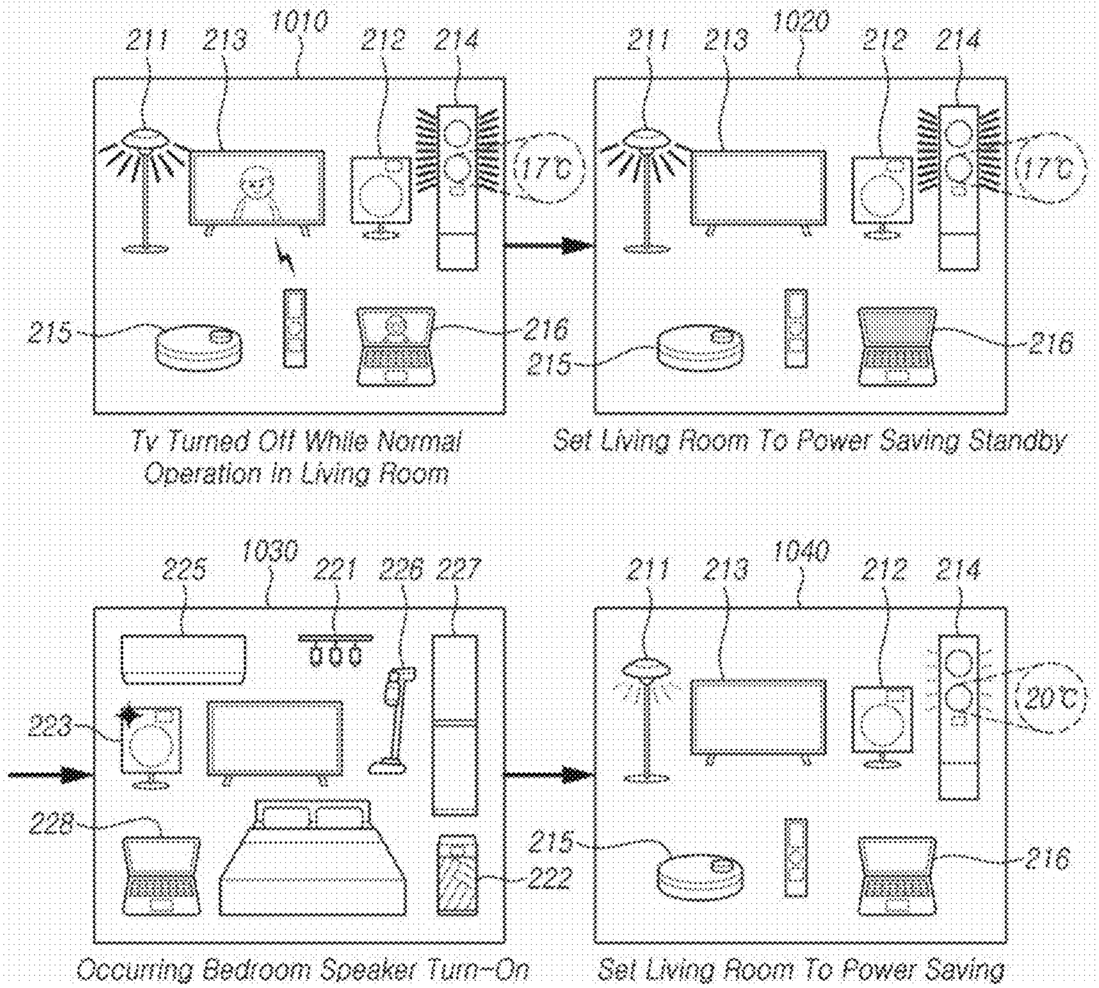
FIG. 10 schematically illustrates an example situation in which space-specific power-saving management is performed on electronic devices, according to one or more embodiment.

Specifically, FIG. 10 is a view schematically illustrating an example context flow for controlling electronic devices in one space to enter the power saving state according to one or more embodiments.

First, in context 1010, a power turn-off signal for the TV 213 is generated and obtained while the electronic devices, i.e., the lighting lamp 211, the TV 213, the air conditioner 214, and the laptop computer 216, disposed in the living room space (not in the power saving state or the power saving standby state, but in a normal operation state according to the user setting) are in an active state. In an embodiment, the managing device 20 may determine in which space (i.e., living room) the TV which generated the obtained signal belongs, whether the corresponding TV belongs to the absence estimation group, and whether the obtained turn-off signal corresponds to the absence estimation signal, with reference to the database 30. In an embodiment, since the TV 213 in the living room space belongs to the absence estimation group and the turn-off signal corresponds to the absence estimation signal, as in context 1020, the managing device 20 may set each electronic device in the living room space, such as e.g., the lighting lamp 211, the speaker 212, the TV 213, the air conditioner 214, the cleaning robot 215, and the laptop computer 216, to the power saving standby state. In an embodiment, the managing device 20 may update the database 30 accordingly. In an embodiment, if the electronic device is set to the power saving standby state, the operational state of each corresponding electronic device is not changed and information about the database 30 corresponding thereto may be updated, but the disclosure is not limited thereto. In an embodiment, the managing device 20 may set the power saving standby timer to a predetermined value.

In context 1030, a turn-on signal for the speaker 223 in another space, i.e., the bedroom space, may be generated and obtained. In an embodiment, the managing device 20 may determine, with reference to the database 30, which space (i.e., bedroom) the speaker in which the signal is generated belongs, whether the corresponding speaker belongs to the occupancy estimation group, and whether the obtained turn-on signal corresponds to the occupancy estimation signal. In an embodiment, since the speaker 223 of the bedroom belongs to the occupancy estimation group and the turn-on signal corresponds to the occupancy estimation signal, as in context 1040, the managing device 20 may set each electronic device of the living room space, e.g., the lighting lamp 211, the speaker 212, the TV 213, the air conditioner 214, the cleaning robot 215, and the laptop computer 216, which are currently set to the power saving standby state, to the power saving mode with reference to the database 30. In an embodiment, the managing device 20 may store the current state of each of the corresponding electronic devices in the database 30 and transmit a control command for allowing each of the corresponding electronic devices to enter the power saving state. In an embodiment, in response to a control command from the managing device 20, each electronic device, i.e., the lighting lamp 211, the speaker 212, the TV 213, the air conditioner 214, the cleaning robot 215, and the laptop computer 216, may enter a predetermined power saving mode (e.g., a predetermined power saving setting such as turned off, reducing the set illuminance to a predetermined low value, or setting the set temperature to a predetermined high temperature). In an embodiment, as illustrated, as the electronic device enters the power saving state from the power saving standby state, the illuminance of the lighting lamp 211 in the living room may be lowered, the set temperature of the air conditioner 214 may be increased, the laptop computer 216 may be turned off, but the disclosure is not limited to a specific embodiment.

Figure 11:
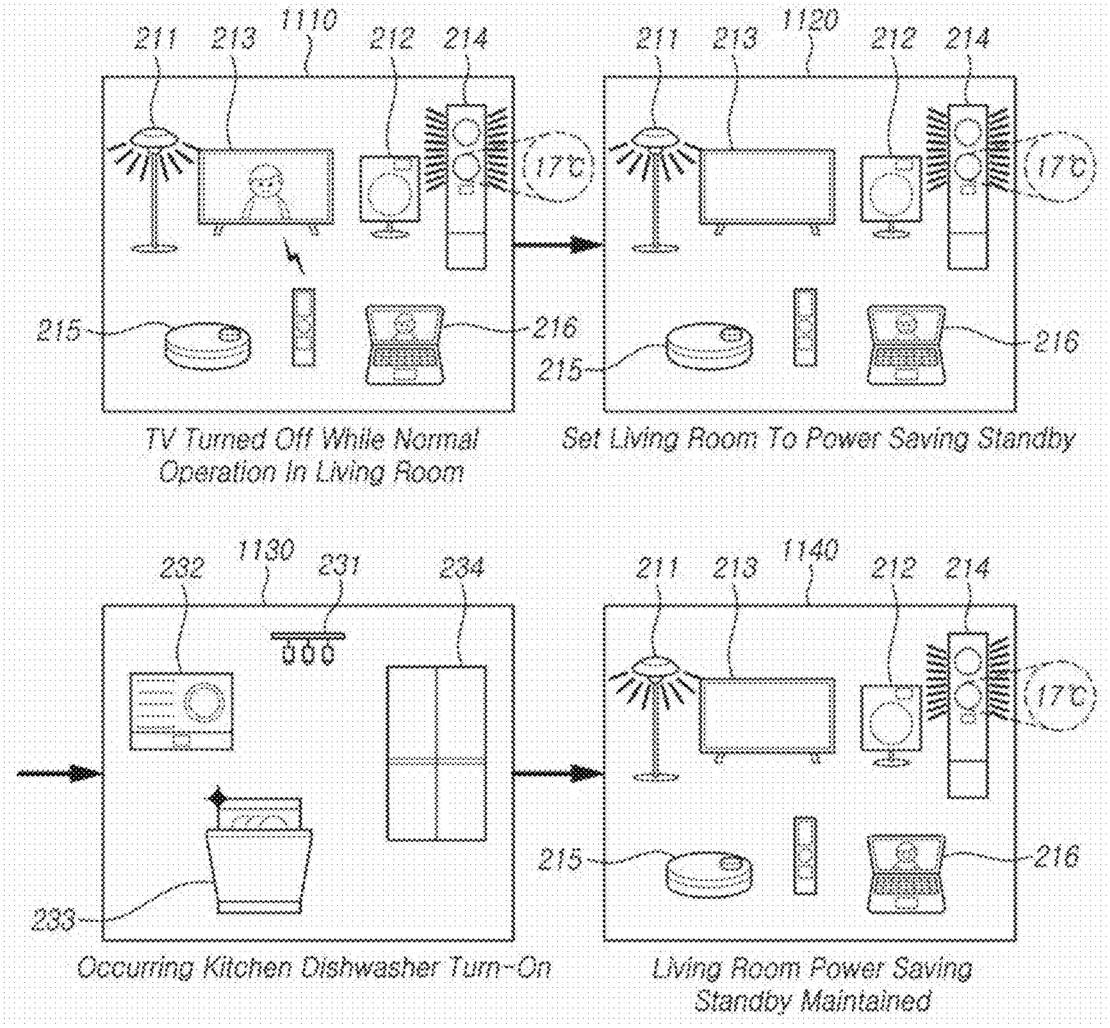
FIG. 11 schematically illustrates an example situation in which space-specific power-saving management is performed on electronic devices according to one or more embodiments.

FIG. 11 is a view schematically illustrating an example context flow in which control is performed to maintain electronic devices in the power saving standby state of one space, in the power saving standby state according to one or more embodiments.

As illustrated, context 1110 and context 1120 are same as context 1010 to context 1020 of FIG. 10, and descriptions thereof will be omitted. In context 1130, each electronic device in the living room space is set to the power saving standby state, and a turn-on signal of the dishwasher 233 in the kitchen space may be generated and obtained. In an embodiment, the managing device 20 may determine which space (i.e., the kitchen) the dishwasher, in which the signal is generated, belongs, whether the corresponding dishwasher belongs to the occupancy estimation group, and whether the obtained turn-on signal corresponds to the occupancy estimation signal, with reference to the database 30. In an embodiment, since the dishwasher 233 in the kitchen space does not belong to the occupancy estimation group, as in context 1140, the managing device 20 may reset or extend the power saving standby timer while maintaining the state of the living room space currently set to the power saving standby state. In an embodiment, as illustrated, the operational state of each electronic device in the living room space maintained in the power saving standby state may remain unchanged.

Figure 12:
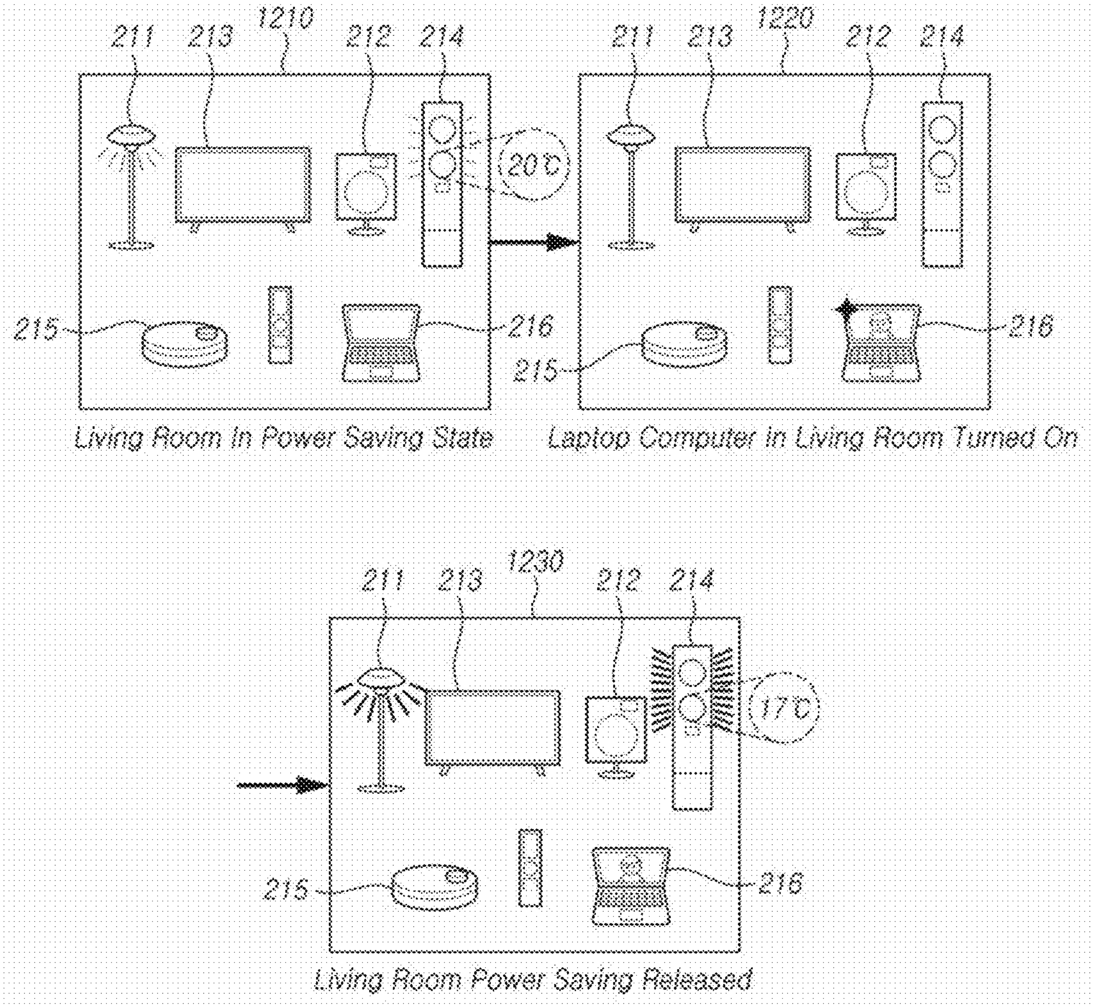
FIG. 12 schematically illustrates an example situation in which space-specific power-saving management is performed on electronic devices according to one or more embodiments.

FIG. 12 is a view schematically illustrating an example context in which control is performed to return (e.g., enter) the electronic devices in one space in the power saving state to a pre-power saving state according to one or more embodiments.

In context 1210, each of the lighting lamp 211, the speaker 212, the TV 213, the air conditioner 214, the cleaning robot 215, and the laptop computer 216 of the living room space is in the power saving state. As illustrated, the lighting lamp 211 is operating at a low illuminance in the power saving mode, the air conditioner 214 is operating at a high set temperature in the power saving mode, and all other devices are turned off. In context 1220, the user's turn-on control input may be generated in the laptop computer 216, and the managing device 20 may obtain such a control input signal. In an embodiment, the managing device 20 may determine, with reference to the database 30, which space (i.e., the living room) the laptop computer in which the signal is generated belongs, whether the corresponding laptop computer belongs to the occupancy estimation group, and whether the obtained turn-on signal corresponds to the occupancy estimation signal. In an embodiment, since the laptop computer 216 in the living room space belongs to the occupancy estimation group and the turn-on signal corresponds to the occupancy estimation signal, as in context 1230, the managing device 20 may release the living room space currently set to the power saving standby state from the power saving state with reference to the database 30 and control each electronic device, e.g., the lighting lamp 211, the speaker 212, the TV 213, the air conditioner 214, the cleaning robot 215, and the laptop computer 216, to return to the pre-power saving state. In an embodiment, the managing device 20 may transmit a control command for returning (e.g., entering) each electronic device to the previous state by referring to the pre-power saving state information about each electronic device stored in the database 30. In an embodiment, in response to a control command from the managing device 20, each electronic device in the living room space may return to (e.g., enter) the pre-power saving operation state, such as being turned on, illuminance rising, or the set temperature falling. As illustrated, the lighting lamp 211, the TV 213, the air conditioner 214, and the laptop computer 216 are in the active state in the living room space where it has returned to the pre-power saving state, but the disclosure is not limited thereto.

Figure 13:
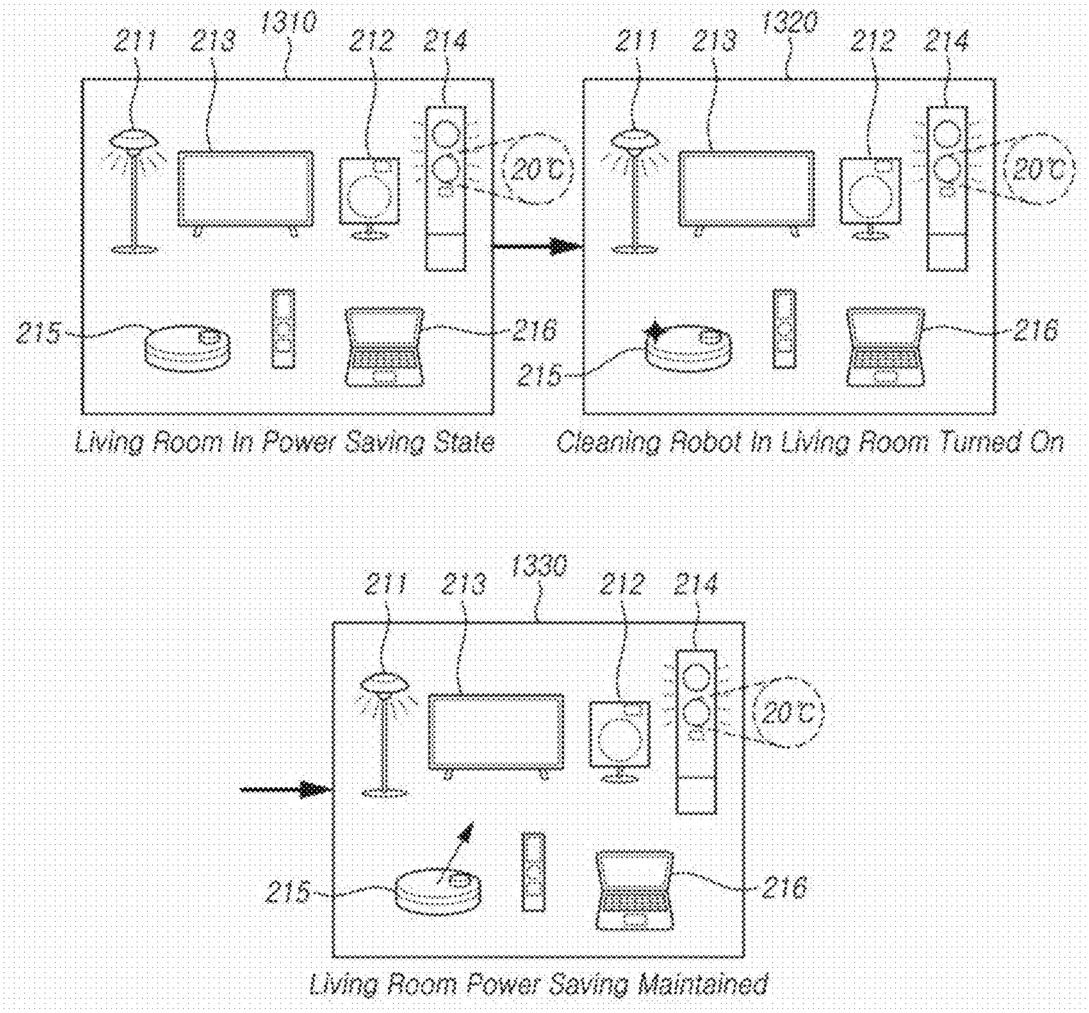
FIG. 13 schematically illustrates an example situation in which space-specific power-saving management is performed on electronic devices according to one or more embodiments.

FIG. 13 is a view schematically illustrating an example context in which control for maintaining power saving states of electronic devices in one space in the power saving state is performed according to one or more embodiments.

In context 1310, each of the lighting lamp 211, the speaker 212, the TV 213, the air conditioner 214, the cleaning robot 215, and the laptop computer 216 in the living room space is in the power saving state. As illustrated, among the electronic devices in the living room space, the lighting lamp 211 is operating at a low illuminance in the power saving mode, the air conditioner 214 is operating at a high set temperature in the power saving mode, and all other devices are turned off. In context 1320, the user's turn-on control input may be generated in the cleaning robot 215, and the managing device 20 may obtain such a control input signal. The managing device 20 may determine which space (i.e., the living room) the cleaning robot in which the signal is generated belongs, whether the corresponding cleaning robot belongs to the occupancy estimation group, and whether the obtained turn-on signal corresponds to the occupancy estimation signal, with reference to the database 30. In an embodiment, since the cleaning robot 215 of the living room space does not belong to the occupancy estimation group, as in context 1340, the managing device 20 may control each electronic device of the living room space, which is currently set to the power saving state, to remain in the power saving state. In context 1330, the lighting lamp 211, the speaker 212, the TV 213, the air conditioner 214, and the laptop computer 216 in the living room space maintain the power saving state, while the turn-on state in the cleaning robot 215 is maintained. In another embodiment, the cleaning robot 215 may be turned off again according to the determination that the power saving state of the living room space is maintained, but the disclosure is not limited to a specific case.

Figure 14:
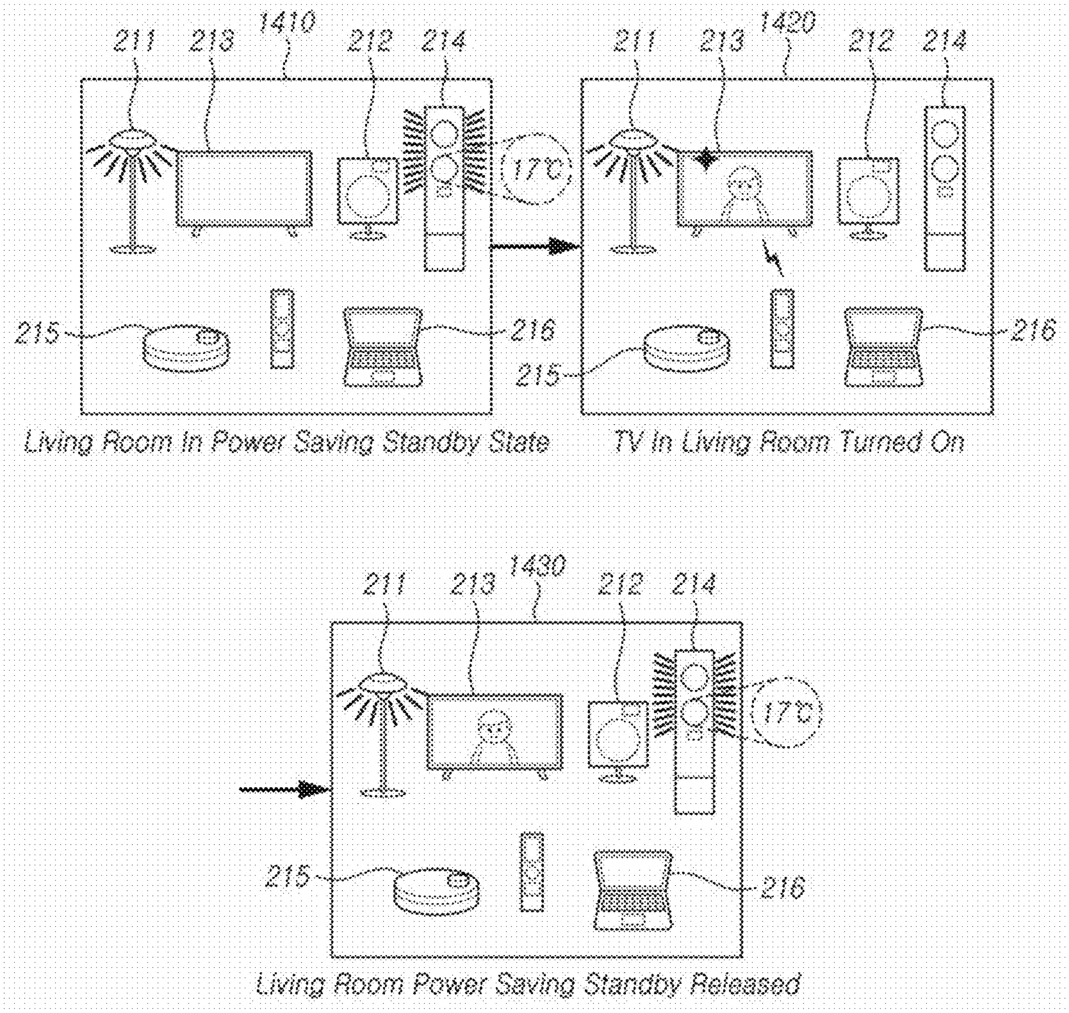
FIG. 14 schematically illustrates an example situation in which space-specific power-saving management is performed on electronic devices according to one or more embodiments.

FIG. 14 is a view schematically illustrating an example context in which control is performed to release electronic devices in one space in the power saving standby state from the power saving standby state according to one or more embodiments.

In context 1410, each of the lighting lamp 211, the speaker 212, the TV 213, the air conditioner 214, the cleaning robot 215, and the laptop computer 216 of the living room space is in the power saving standby state. As illustrated, among the electronic devices in the living room space, the lighting lamp 211 and the air conditioner 214 are in the active state. In operation 1420, the user's turn-on control input may be generated on the TV 213 among the above-described electronic devices, and the managing device 20 may obtain such a control input signal. The managing device 20 may determine which space (i.e., living room) the TV in which the signal is generated belongs, whether the corresponding TV belongs to the occupancy estimation group, and whether the obtained turn-on signal corresponds to the occupancy estimation signal, with reference to the database 30. In an embodiment, since the TV 213 of the living room space belongs to the occupancy estimation group and the turn-on signal corresponds to the occupancy estimation signal, as in context 1430, the managing device 20 may control each electronic device of the living room space, e.g., the lighting lamp 211, the speaker 212, the TV 213, the air conditioner 214, the cleaning robot 215, and the laptop computer 216, which are currently set to the power saving standby state, to be released from the power saving standby state with reference to the database 30.

Figure 15A:
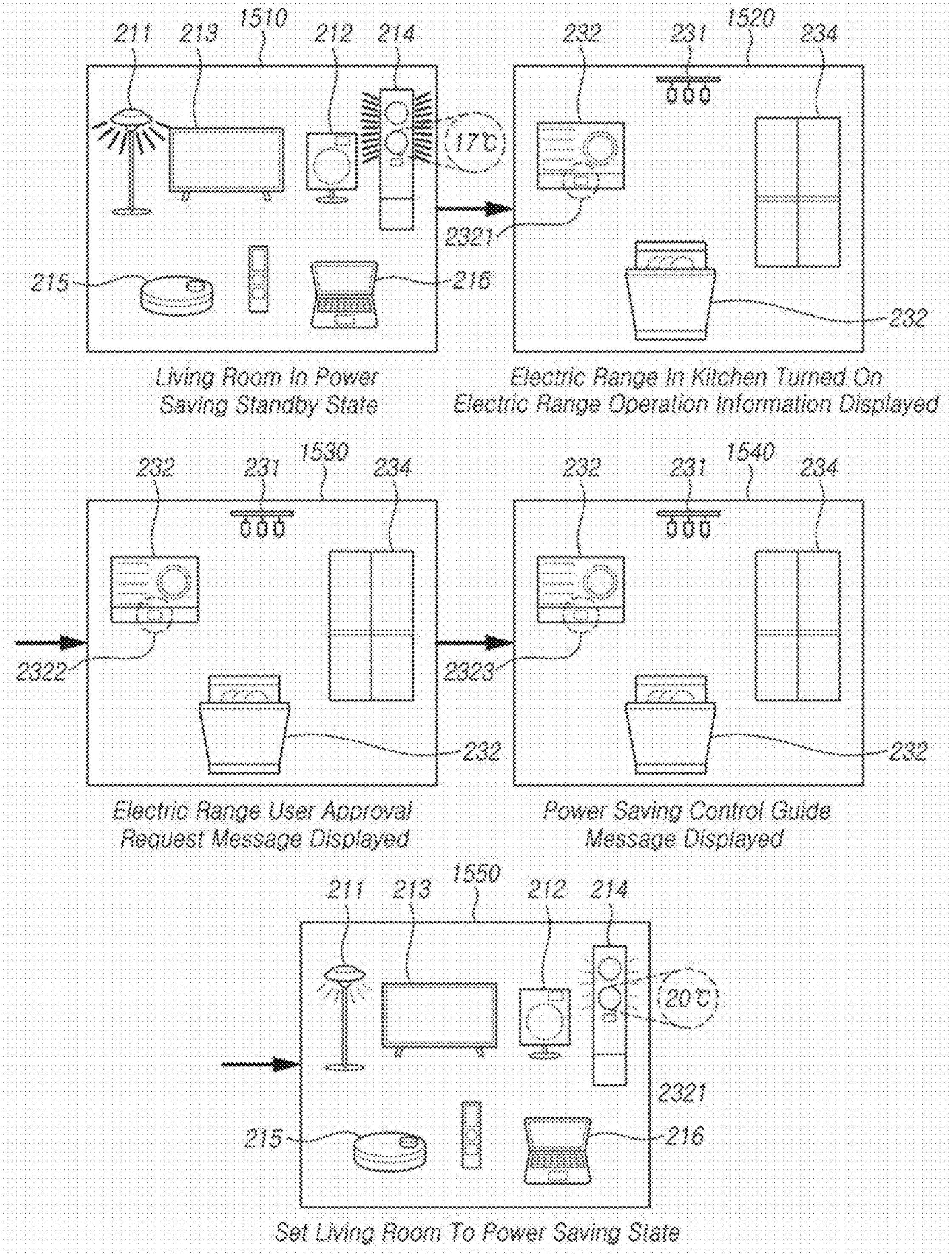
FIG. 15A is a view schematically illustrating an example situation in which space-specific power-saving management is performed on electronic devices according to one or more embodiments.
Figure 15B:
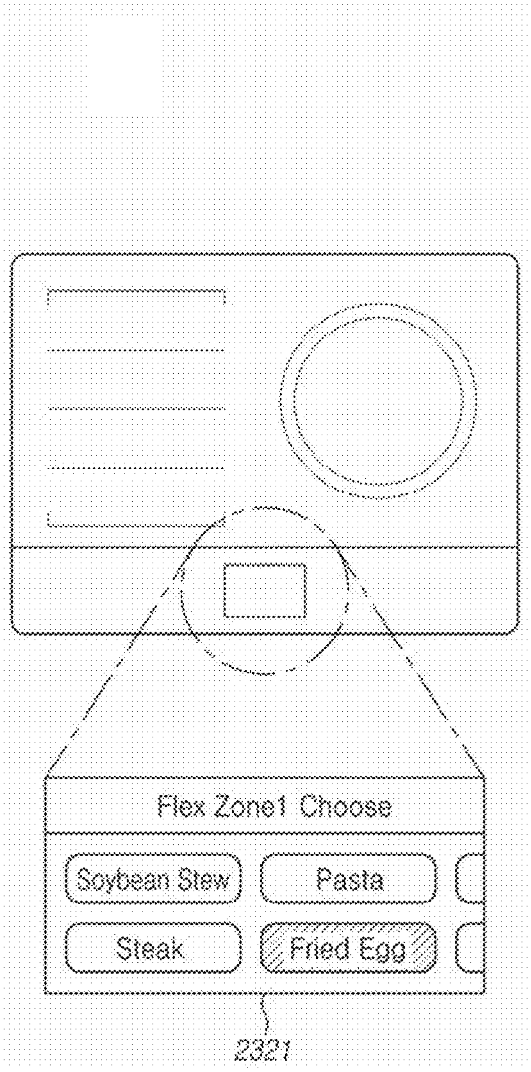
FIGS. 15B, 15C, and 15D illustrate an example related display screen provided to a user according to one or more embodiments.
Figure 15C:
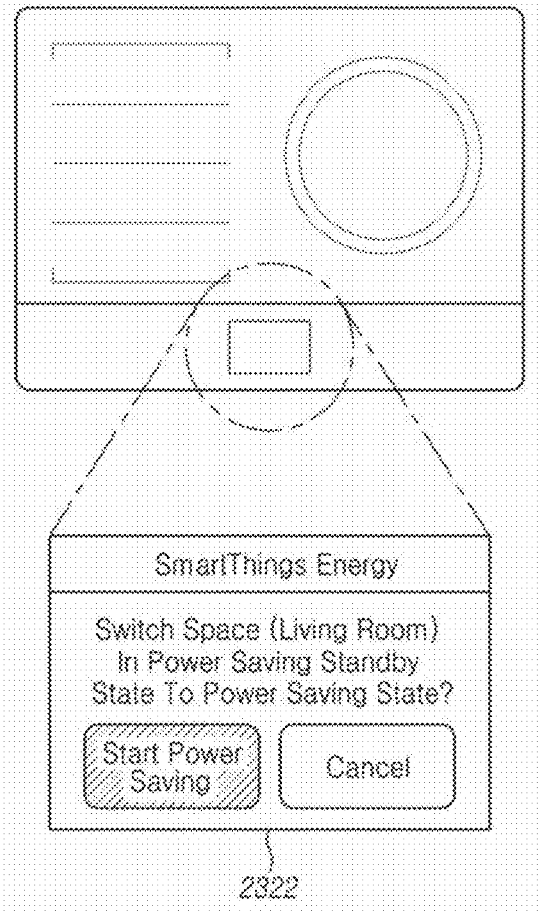
Figure 15D:
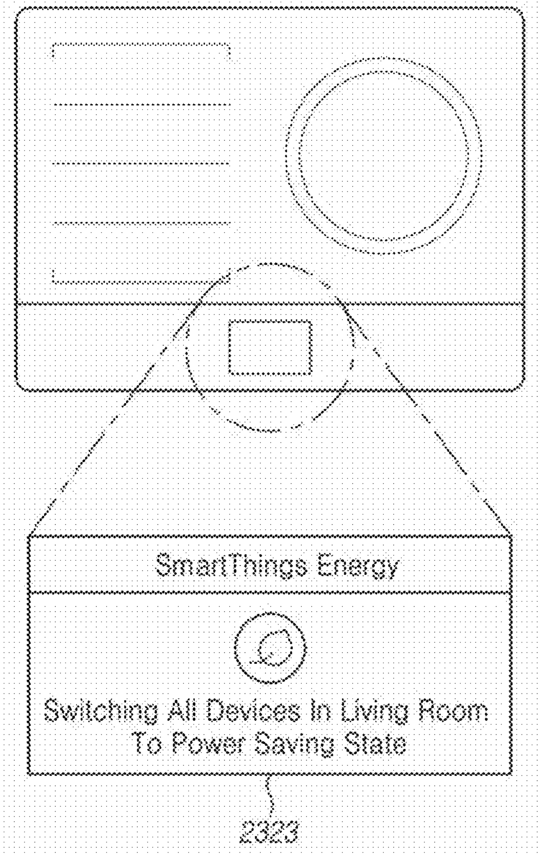

FIG. 15A is a view schematically illustrating an exemplary context in which control to allow electronic devices in one space in the power saving standby state to enter the power saving state under user approval, according to an embodiment of the disclosure. FIGS. 15B, 15B, and 15D illustrate a related display screen provided to a user.

In context 1510, each of the lighting lamp 211, the speaker 212, the TV 213, the air conditioner 214, the cleaning robot 215, and the laptop computer 216 of the living room space is in the power saving standby state. As illustrated, the lighting lamp 211 and the air conditioner 214 are operating in the active state, and the other devices are turned off. In context 1520, the user's turn-on control input to the electric range 232 may be generated in another space, i.e., the kitchen space, and the managing device 20 may obtain such a control input signal. For reference, information 2321 related to an operation (e.g., a cooking operation) of the electric range 232 may be displayed on a display provided in the electric range 232. An example of the information 2321 displayed on the display of the electric range 232 is illustrated in FIG. 15B.

The managing device 20 may determine which space (I, with reference to the database 30*e*, with reference to the database 30, kitchen) the electric range in which the signal is generated belongs, whether the electric range belongs to the occupancy estimation group, and whether the obtained turn-on signal corresponds to the occupancy estimation signal, with reference to the database 30, with reference to the database 30. In an embodiment, the electric range 232 of the kitchen space belongs to the occupancy estimation group, and the turn-on signal corresponds to the occupancy estimation signal. Therefore, it will be determined that the corresponding signal is the occupancy estimation signal of the occupancy estimation group.

In context 1530, the user approval request message 2322, regarding whether to allow the electronic devices in the living room space in the power saving standby state to enter the power saving state based on the previous determination, may be presented to the user. According to an embodiment, if the managing device 20 determines that the obtained signal is an occupancy estimation signal of the occupancy estimation group, the managing device 20 may generate and provide a message for first requesting a user approval before allowing the electronic devices in the power saving standby state to enter the power saving state. In an embodiment, the managing device 20 may transmit such a user approval request message to the device where the signal for allowing electronic devices in the power saving standby state to enter the power saving state, e.g., in this embodiment, the electric range 232 in the kitchen space, so that such a message 2322 may be displayed on the display of the electric range 232, but the disclosure is not limited thereto. An example of the information 2322 displayed on the display of the electric range 232 is illustrated in FIG. 15C.

The user approval, obtained through the user approval request message 2322 displayed in context 1530, may be transmitted to the managing device 20, and as in context 1540, a guide message 2323 regarding a subsequent power saving control operation may be displayed on the display of the electric range 232. An example of the information 2323 displayed on the display of the electric range 232 is illustrated in FIG. 15D.

In context 1550, the managing device 20 may appropriately control each electronic device in the living room space to enter the power saving state. As illustrated, as the electronic devices in the living room space enters the power saving state, the illuminance of the lighting lamp 211, among the devices previously operating in the active state, is lowered to a predetermined power saving mode value, and the set temperature of the air conditioner 214 is raised to a higher predetermined temperature of the power saving mode.

Figure 16:
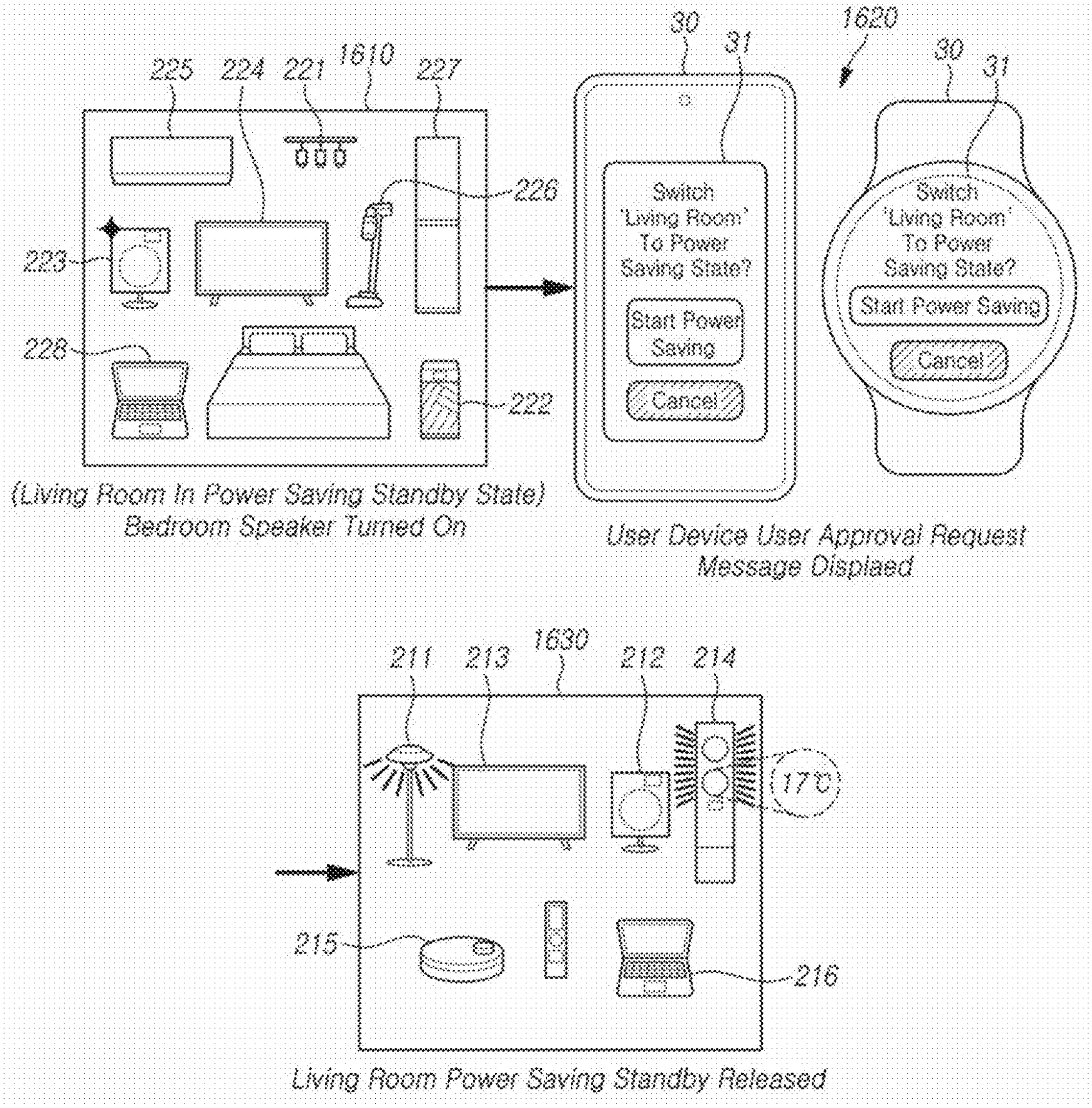
FIG. 16 schematically illustrates an example situation in which space-specific power-saving management is performed on electronic devices according to one or more embodiments.

FIG. 16 is a view schematically illustrating an example context in which control is performed to release electronic devices in one space in the power saving standby state from the power saving standby state under user approval according to one or more embodiments.

In context 1610, although not specifically illustrated, if each of electronic devices in the living room space are in the power saving standby state (the lighting lamp 211 and the air conditioner 214 are in the active state), the user's turn-on control input to the speaker 223 may occur in another space, i.e., the bedroom space, and the managing device 20 may obtain such a control input signal. The managing device 20 may determine which space (i.e., bedroom) the speaker in which the signal is generated belongs, whether the corresponding speaker belongs to the occupancy estimation group, and whether the obtained turn-on control signal corresponds to the occupancy estimation signal, with reference to the database 30. In an embodiment, the speaker 232 of the bedroom space belongs to the occupancy estimation group, and the turn-on control input signal corresponds to the occupancy estimation signal. Therefore, it will be determined that the corresponding control input signal is the occupancy estimation signal of the occupancy estimation group.

In context 1620, the user approval request message 31 regarding whether to permit the living room space in the power saving standby state to enter the power saving state may be presented by the predetermined user device 30. In an embodiment, the managing device 20 may generate and provide a message for requesting the user approval request before allowing the electronic devices in the power saving standby state to enter the power saving state. In an embodiment, the managing device 20 may display such a user approval request message through the predetermined user device 30, e.g., a user smartphone or a smart watch, but the disclosure is not limited thereto. As in context 1620, the user approval rejection obtained through the displayed user approval request message 31 may be transmitted to the managing device 20. In context 1630, the managing device 20 may appropriately control each electronic device in the living room space to be released from the power saving standby state. In an embodiment, the operational state of the devices in the living room space may be the same as when the devices are in the power saving standby state. Although not illustrated, the managing device 20 may release the power saving standby timer.

Figure 17:
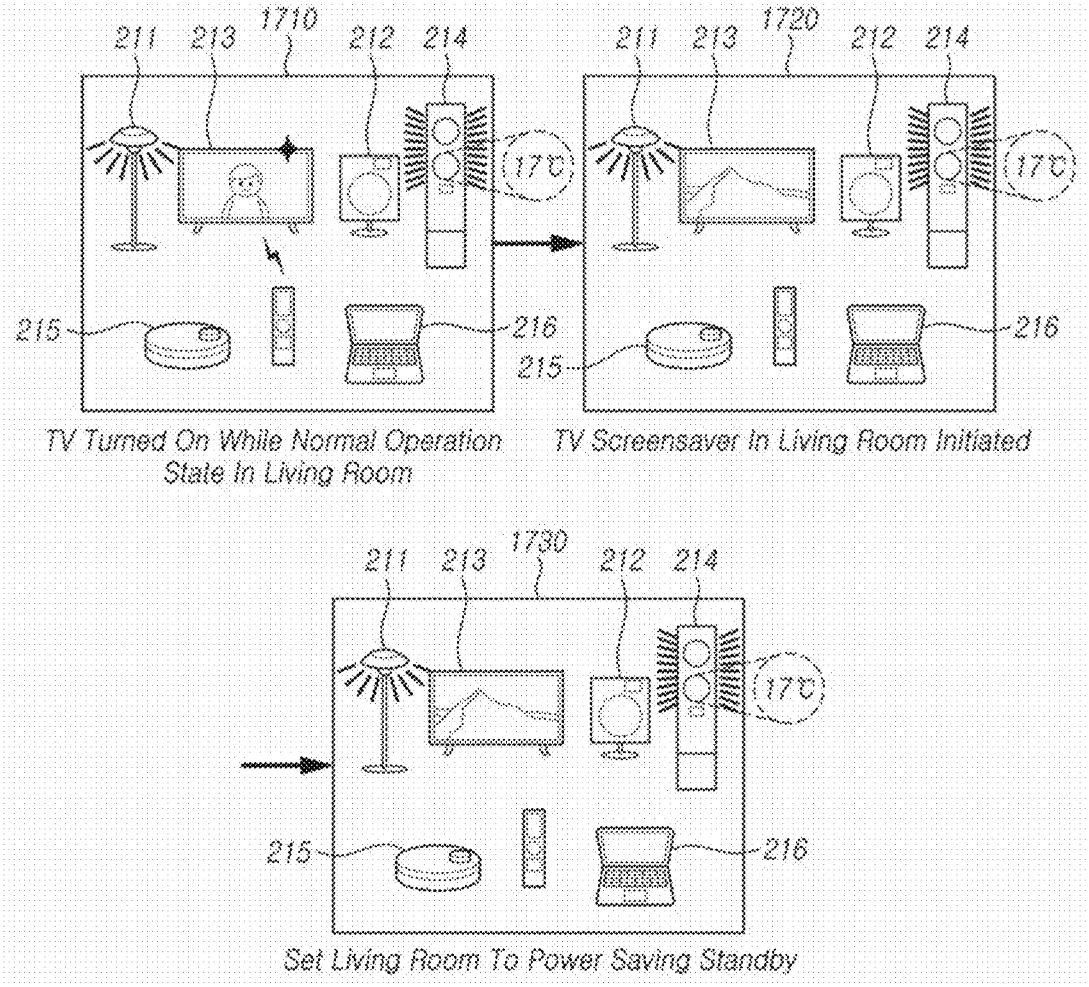
FIG. 17 schematically illustrates an example situation in which space-specific power-saving management is performed on electronic devices according to one or more embodiments.

FIG. 17 is a view schematically illustrating an example context in which control for allowing electronic devices in one space to enter the power saving standby state is performed according to one or more embodiments.

In context 1710, each of the lighting lamp 211, the TV 213, and the air conditioner 214 in the living room space (a normal operation state that is not set to the power saving state or the power saving standby state) is in the active state. In context 1720, if there is no user interaction with the TV 213 for at least a predetermined time, the screen saver of the TV 213 may be activated, and such information may be transmitted to the managing device 20. Referring to the database 30, the managing device 20 may determine which space (i.e., living room) the TV in which the signal is generated belongs, whether the corresponding TV belongs to the absence estimation group, and whether the obtained screen saver start signal corresponds to the absence estimation signal. In an embodiment, since the TV 213 in the living room space belongs to the absence estimation group and the screen saver start signal corresponds to the absence estimation signal, as in context 1730, the managing device 20 may set each electronic device in the living room space, e.g., the lighting lamp 211, the speaker 212, the TV 213, the air conditioner 214, the cleaning robot 215, and the laptop computer 216, to the power saving standby state and update the database 30 accordingly.

Figure 18:
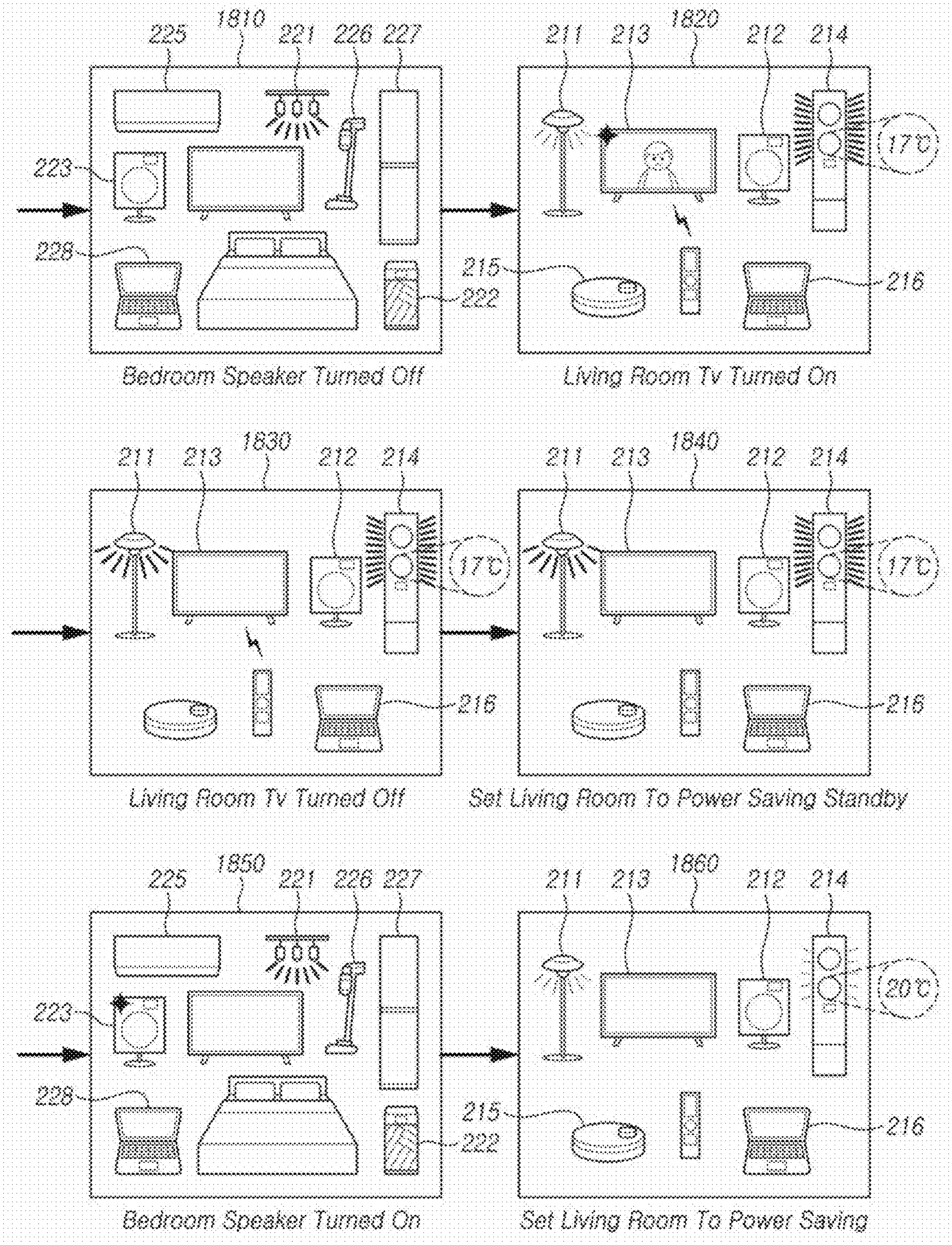
FIG. 18 schematically illustrates an example situation in which space-specific power-saving management is performed on electronic devices according to one or more embodiments.

FIG. 18 is a view schematically illustrating an example context flow for controlling electronic devices in one space to enter the power saving state according to one or more embodiments.

In context 1810, a power turn-off signal may be generated for the speaker 223 of the bedroom space (which is in a normal operation state rather than the power saving standby state or the power saving state) and may be obtained by the managing device 20. As illustrated, only the ceiling light 221 is active in the bedroom space. Referring to the database 30, the managing device 20 may determine which space (i.e., bedroom) the speaker, in which the obtained signal is generated, belongs, whether the corresponding speaker belongs to the absence estimation group, and whether the obtained turn-off control input signal corresponds to the absence estimation signal. In an embodiment, since the speaker 232 in the bedroom space does not belong to the absence estimation group, the managing device 20 may not perform a separate power-saving management operation.

In context 1820, after the power turn-on control input signal for the TV 213 is generated in the living room space (the power saving standby state or the normal operation state, not the power saving state), the power turn-off control input signal for the TV 213 in the living room space may be generated in context 1840, and the managing device 20 may obtain such a signal. As illustrated in context 1830, the lighting lamp 211 and the air conditioner 214 are in the active state in the living room space. The managing device 20 may determine which space (i.e., living room) the TV, in which the corresponding signal is generated, belongs, whether the corresponding TV belongs to the absence estimation group, and whether the obtained turn-off control input signal corresponds to the absence estimation signal, with reference to the database 30. In an embodiment, since the TV 213 in the living room space belongs to the absence estimation group and the turn-off signal corresponds to the absence estimation signal, as in context 1840, the managing device 20 may set each electronic device in the living room space, e.g., the lighting lamp 211, the speaker 212, the TV 213, the air conditioner 214, the cleaning robot 215, and the laptop computer 216, to the power saving standby state and update the database 30 accordingly. As illustrated, the operational states of the electronic devices in the living room are maintained as before (the lighting lamp 211 and the air conditioner 214 operate in the same active state as before).

Thereafter, in context 1850, a power turn-on control input signal for the speaker device may be obtained in the bedroom space, and the managing device 20 may obtain the power turn-on control input signal. The managing device 20 may determine which space (i.e., bedroom) the speaker in which the signal is generated belongs, whether the corresponding speaker belongs to the occupancy estimation group, and whether the obtained turn-on signal corresponds to the occupancy estimation signal, with reference to the database 30. In an embodiment, since the speaker device in the bedroom space belongs to the occupancy estimation group and the turn-on control input signal corresponds to the occupancy estimation signal, as in context 1860, the managing device 20 may set each electronic device in the living room space, e.g., the lighting lamp 211, the speaker 212, the TV 213, the air conditioner 214, the cleaning robot 215, and the laptop computer 216, which are currently set to the power saving standby state, to the power saving state, with reference to the database 30. In an embodiment, the managing device 20 may store the current state of each of the corresponding electronic devices in the database 30 and transmit a control command for allowing each of the corresponding electronic devices to enter the power saving state. As illustrated, as each electronic device in the living room enters the power saving state, the lighting lamp 211 and the air conditioner 214, which were previously operating in the active state, may operate in a lower active state (e.g., lower illuminance and higher set temperature) than before.

Figure 19B:
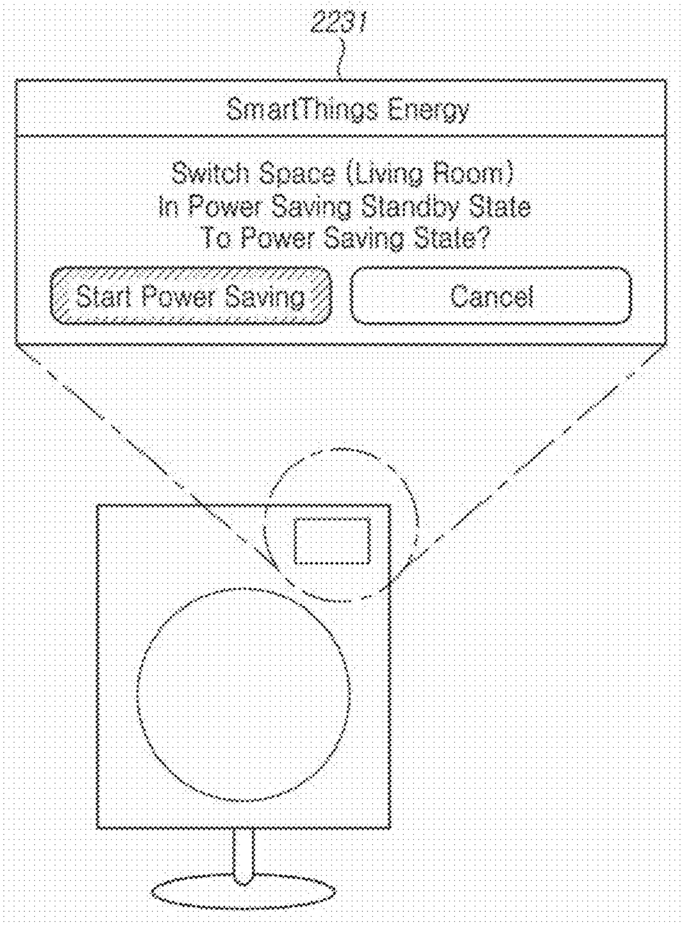
FIGS. 19B, 19C, and 19D illustrate an example related display screen provided to a user according to one or more embodiments.
Figure 19C:
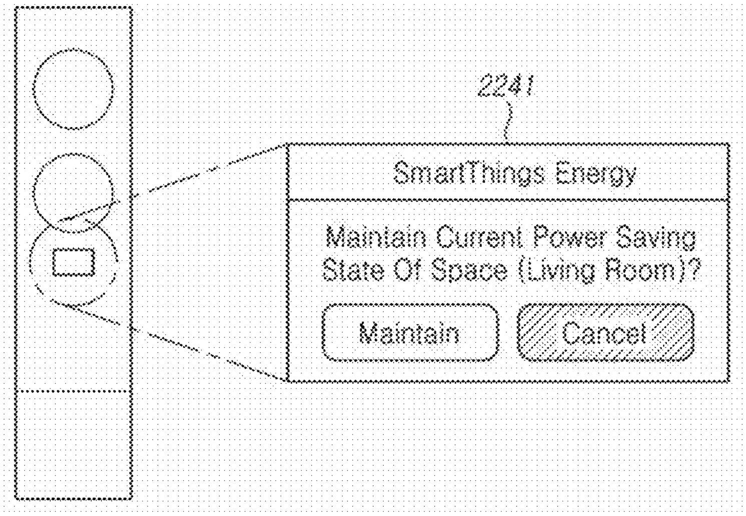
Figure 19D:
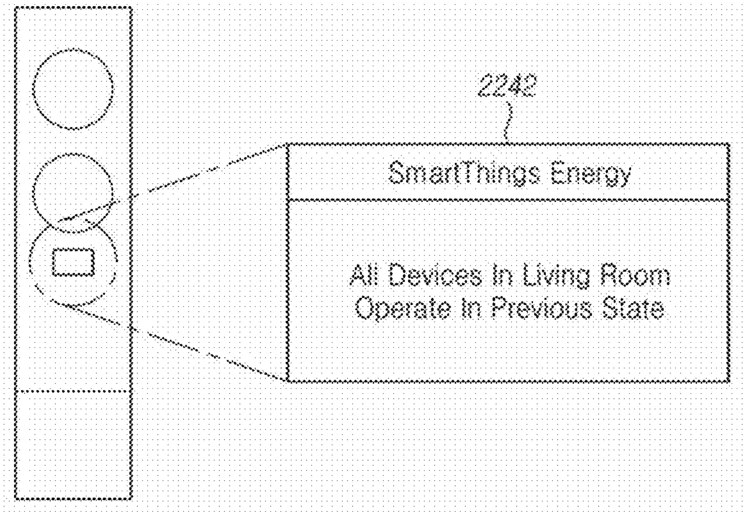

FIG. 19A is a view schematically illustrating an example context in which control for allowing a space to enter the power saving state or releasing the space from the power saving state is performed under user approval according to one or more embodiments. FIGS. 19B, 19C, and 19D illustrate a related display screen provided to a user.

In context 1910, although not specifically illustrated, if the electronic devices in the living room space are set to the power saving standby state (e.g., the lighting lamp 211 is operating at a high illuminance, the air conditioner 214 is operating at a low set temperature, and the TV is turned on), a user turn-on control input to the speaker 223 may occur in another space, i.e., the bedroom space, and the managing device 20 may obtain such a control input signal. The managing device 20 may determine which space (I, with reference to the database 30.*e*, with reference to the database 30, bedroom) the speaker in which the obtained control input signal is generated belongs, whether the corresponding speaker belongs to the occupancy estimation group, and whether the obtained turn-off control input signal corresponds to the occupancy estimation signal, with reference to the database 30. In an embodiment, the managing device 20 may determine that the speaker 223 of the bedroom space belongs to the occupancy estimation group, and the turn-on control input signal corresponds to the occupancy estimation signal, and may determine to allow the living room space to enter the power saving state. In this embodiment, the managing device 20, however, may first perform a procedure of seeking approval from the user, instead of immediately transmitting a control command for allowing each electronic device in the power saving standby state to enter the power saving state. For example, as in context 1920, the managing device 20 may transmit an approval request message 2231 to a predetermined electronic device, e.g., the device (in the instant example, the speaker 223 in the bedroom space) where the signal for allowing the electronic devices in the power saving standby state to enter the power saving state has been generated), so that the approval request message 2231 may be displayed on the display of the corresponding speaker device, but the disclosure is not limited thereto. An example of the approval request message 2231 displayed on the display of the speaker 223 Is Illustrated in FIG. 19B.

If the user approval is obtained through the user approval request message 2231 in context 1920, the managing device 20 may control each electronic device in the living room space to enter the power saving state. As illustrated in context 1930, in the living room space in the power saving state, the illuminance of the lighting lamp 211 may be changed to a predetermined low value, and the cooling temperature of the air conditioner 214 may be changed to a predetermined high value. In context 1940, the managing device 20 may again seek user approval through the electronic device positioned in the living room space. For example, as in context 1950, the managing device 20 may be an electronic device (e.g., an electronic device including a display in the living room space) of the space that has entered power saving, i.e., the living room space, and in this embodiment, the managing device 20 may once again display the user approval request message 2141 through the air conditioner 214. This is to prevent unintended user inconvenience from occurring as power saving of a predetermined space (e.g., the living room) is performed based on another user's interaction generated in another space (e.g., the bedroom) when a user is present in each space. An example of the user approval request message 2141 displayed on the display of the air conditioner 214 is illustrated in FIG. 19C.

In context 1940, after the user confirmation request message 2141, regarding whether to maintain the power saving state in the living room space, is displayed on the display of the air conditioner 214 in the living room space, an instruction to release the power saving is obtained from the user. In such a case, as in context 1950, a guide message 2142, regarding a subsequent power saving control operation, may be displayed on the display of the air conditioner 214. An example of the guide message 2142 displayed on the display of the air conditioner 214 is illustrated in FIG. 19D.

In context 1960, the managing device 20 may control each electronic device in the living room space to exit the power saving state and may return (e.g., enter) the electronic device to the previous normal operation state. As illustrated, the lighting lamp 211 in the living room may operate again at the previous high illuminance, the TV may be turned on, and the cooling setting temperature of the air conditioner 214 may be lowered to the previous low value.

Figure 20:
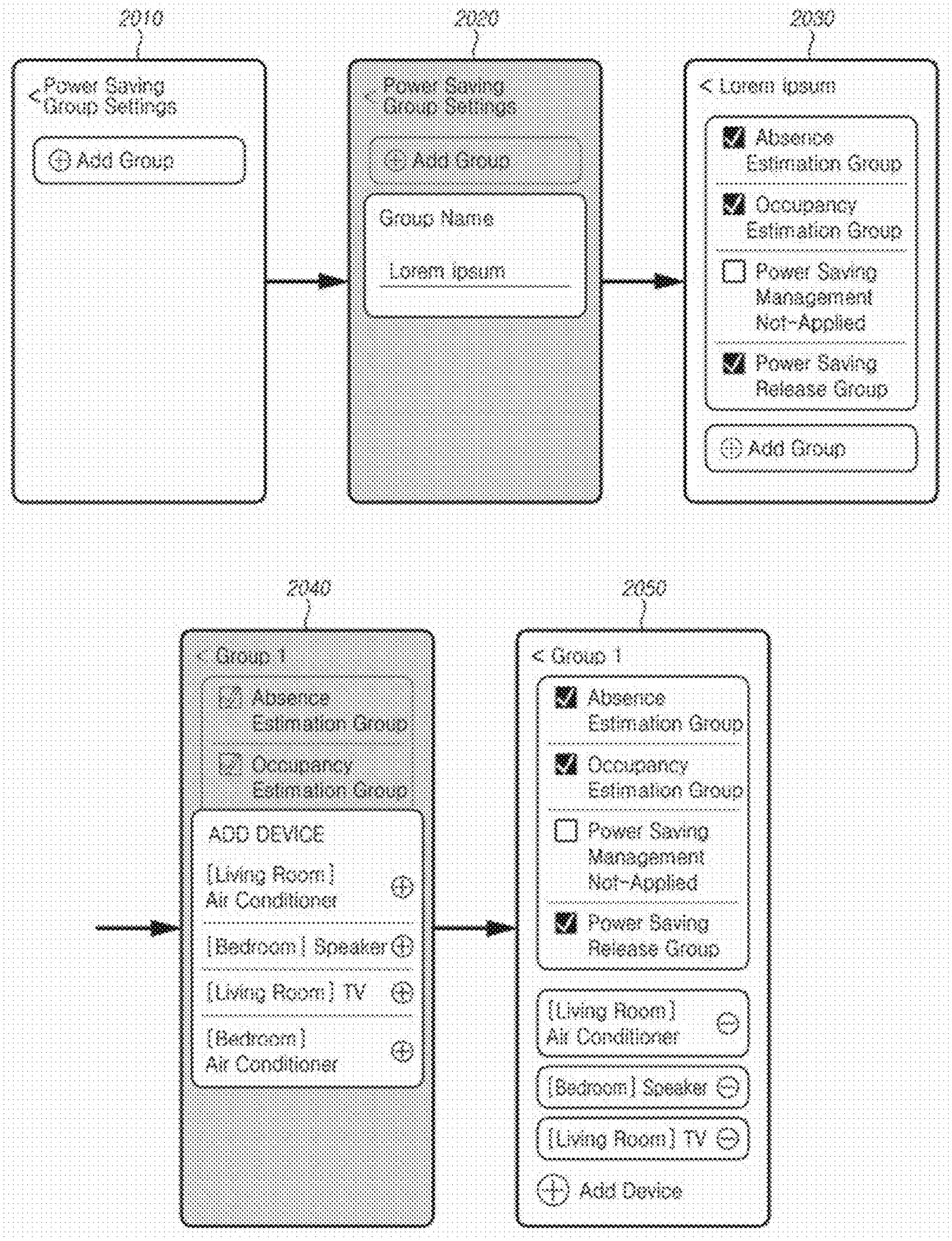
FIG. 20 is a view schematically illustrating example user interface screens in a process in which the user classifies electronic devices into respective customized groups for space-specific power-saving management according to one or more embodiments.

FIG. 20 is a view schematically illustrating example user interface screens in a process in which the user classifies electronic devices into respective customized groups for space-specific power-saving management according to one or more embodiments. For example, the user may determine whether to include the electronic devices registered in relation to the corresponding user account in the absence estimation group, the occupancy estimation group, the space-specific power-saving management non-applied group, and/or the power saving release group.

In this regard, the screen 2010 and the screen 2020 show user interface screens for initiating customized group setting for space-specific power-saving management and inputting a group name. On the screen 2030, items for selecting which group of the currently set group is to be classified in relation to space-specific power-saving management are presented (e.g., displayed). As illustrated in screen 2030, e.g., the group currently being set is set to be included in each of the absence estimation group, the occupancy estimation group, and the power saving release group. Next, interface items for selecting space-specific devices to be included in the group currently being set are displayed on the screen 2040. On the screen 2050, each setting option of the group currently being set is listed, and thus the corresponding group setting procedure may be completed.

Figure 21:
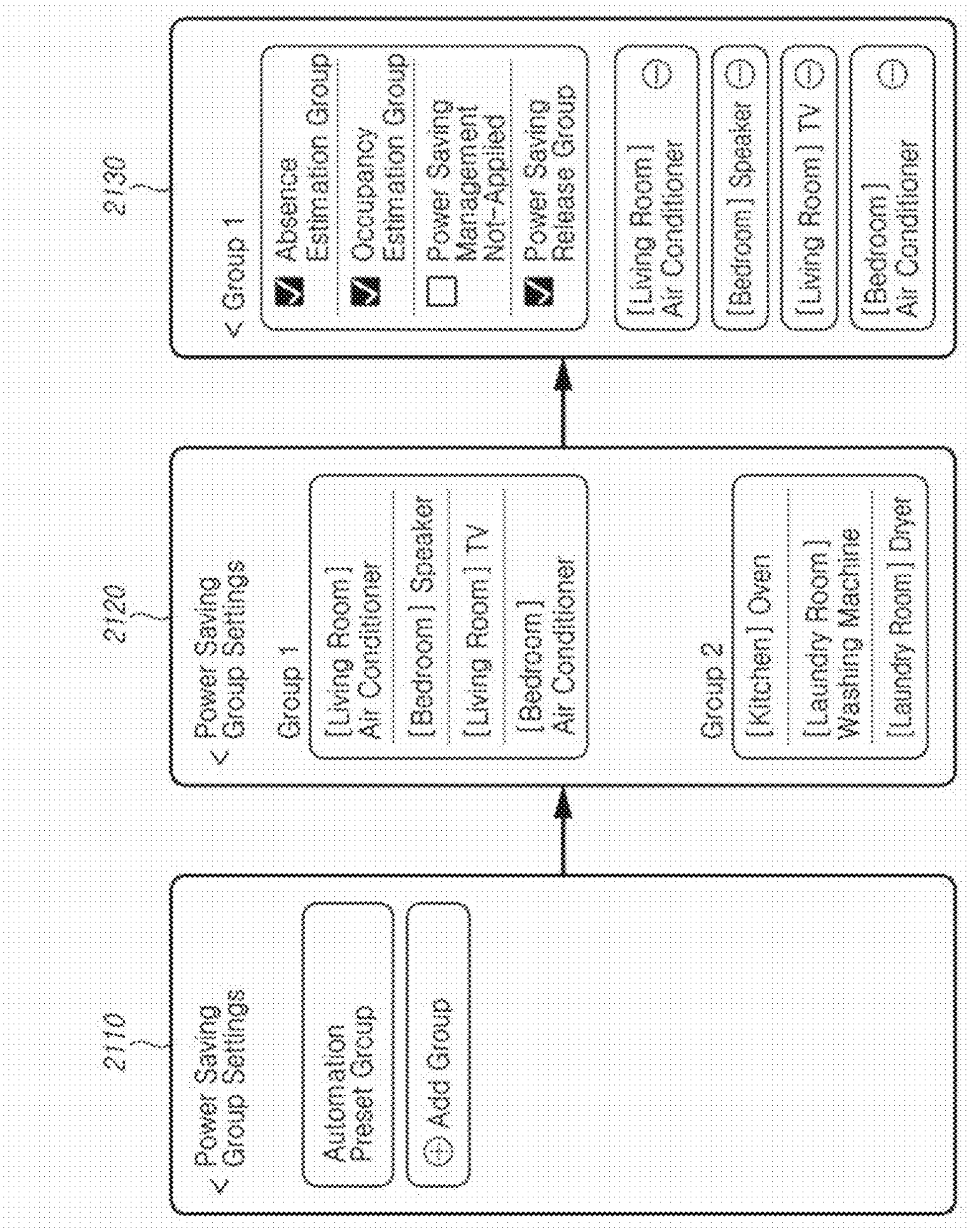
FIG. 21 illustrates example user interface screens showing groups of electronic devices according to system settings for space-specific power-saving management according to one or more embodiments.

FIG. 21 illustrates example user interface screens showing groups of electronic devices according to system settings for space-specific power-saving management according to one or more embodiments.

As illustrated, an automatic setting group 2111 item may be selected to identify the system setting on the screen 2110. On the screen 2120, two groups for space-specific power-saving management that are automatically set and classified, in advance, in the system are displayed. If group 1 is selected from the screen 2120, the settings related to group 1, e.g., group 1 is included in all of the absence estimation group, the occupancy estimation group, and the power saving release group, and the air conditioner in the living room, the speaker in the bedroom, the TV in the living room, and the air conditioner in the bedroom are included in the group, are shown on the screen 2130.

FIGS. 20 and 21 illustrate example settings for each of the absence estimation group, the occupancy estimation group, the power saving release group, and the space-specific power-saving management exception group may be customized according to the user setting through user device or may be automatically performed according to a system setting, but the disclosure is not limited to a specific case. In an embodiment, the user may select to perform space-specific power-saving management operation(s) based on a customized device classification setting or based on a system device classification setting. According to an embodiment, the device classification by the user or the system setting may be dynamically changed based on the user's usage information accumulated over time, e.g., a usage order or time pattern of the user's electronic devices.

Figure 22:
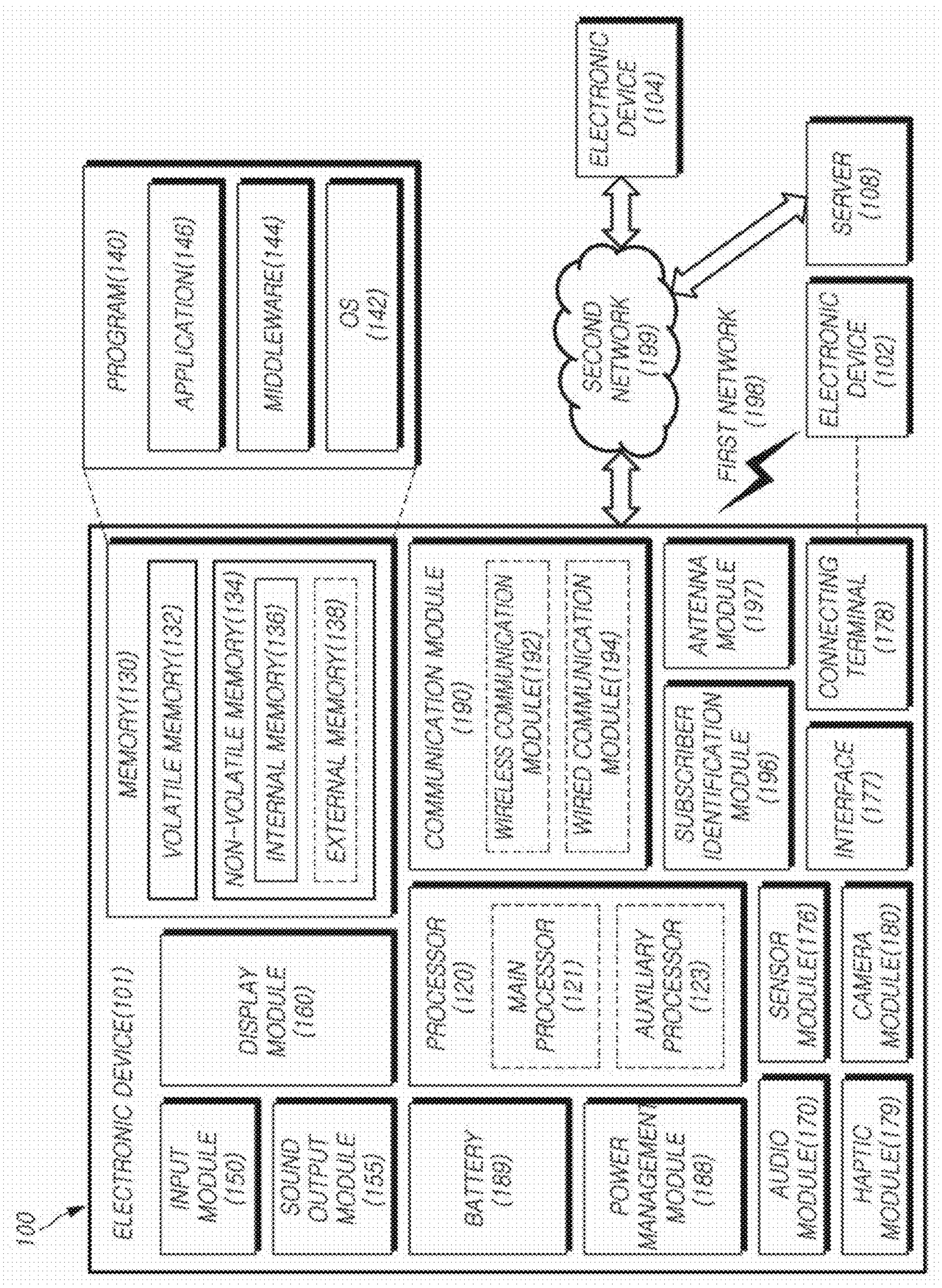
FIG. 22 is a block diagram illustrating an example electronic device in a network environment 100 according to one or more embodiments.

FIG. 22 is a block diagram illustrating an electronic device 101 in a network environment 100 according to various embodiments. Referring to FIG. 22, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mm Wave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

It should be appreciated that various embodiments of the disclosure and the terms used therein are not intended to limit the technological features set forth herein to particular embodiments and include various changes, equivalents, or replacements for a corresponding embodiment. As used herein, the singular forms "a," "an," and "the" are intended to include the plural forms as well, unless the context clearly indicates otherwise. As used herein, the term 'and/or' should be understood as encompassing any and all possible combinations by one or more of the enumerated items. As used herein, the terms "include," "have," and "comprise" are used merely to designate the presence of the feature, component, part, or a combination thereof described herein, but use of the term does not exclude the likelihood of presence or adding one or more other features, components, parts, or combinations thereof. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "$1^{st}$" and "$2^{nd}$," or "first" and "second" may be used to simply distinguish a corresponding component from another, and does not limit the components in other aspect (e.g., importance or order).

As used herein, the term "part" or "module" may include a unit implemented in hardware, software, or firmware, and may interchangeably be used with other terms, for example, "logic," "logic block," "part," or "circuitry". A part or module may be a single integral component, or a minimum unit or part thereof, adapted to perform one or more functions. For example, according to an embodiment, 'part' or 'module' may be implemented in a form of an application-specific integrated circuit (ASIC).

As used in various embodiments of the disclosure, the term "if" may be interpreted as "when," "upon," "in response to determining," or "in response to detecting," depending on the context. Similarly, "if A is determined" or "if A is detected" may be interpreted as "upon determining A" or "in response to determining A", or "upon detecting A" or "in response to detecting A", depending on the context.

The program executed by the electronic device 10, the managing device 20, or the user device 30 described herein may be implemented as a hardware component, a software component, and/or a combination thereof. The program may be executed by any system capable of executing computer readable instructions.

The software may include computer programs, codes, instructions, or combinations of one or more thereof and may configure the processing device as it is operated as desired or may instruct the processing device independently or collectively. The software may be implemented as a computer program including instructions stored in computer-readable storage media. The computer-readable storage media may include, e.g., magnetic storage media (e.g., read-only memory (ROM), random-access memory (RAM), floppy disk, hard disk, etc.) and an optically readable media (e.g., CD-ROM or digital versatile disc (DVD). Further, the computer-readable storage media may be distributed to computer systems connected via a network, and computer-readable codes may be stored and executed in a distributed manner. The computer program may be distributed (e.g., downloaded or uploaded) via an application store (e.g., Play Store™), directly between two (2) user equipments (e.g., smartphones), or online. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. A device comprising:

at least one memory storing one or more instructions and identification information for each of one or more first devices corresponding to a first space and identification information for each of one or more second devices corresponding to a second space different from the first space; and at least one processor configured to execute the one or more instructions, wherein the one or more instructions, when executed by the at least one processor, cause the device to:

classify a first device of the one or more first devices into an absence estimation group and store, in the at least one memory, information indicating that the first device is classified as the absence estimation group, together with the identification information for the first device, classify a second device of the one or more second devices into an occupancy estimation group and store, in the at least one memory, information indicating that the second device is classified as the occupancy estimation group, together with the identification information for the second device, obtain a first signal related to the first device of the one or more first devices, obtain a second signal after obtaining the first signal, wherein the second signal is related to the second device of the one or more second devices, and based on obtaining the second signal, set each of the one or more first devices to a power saving state.

2. The device of claim 1, wherein the one or more instructions, when executed by the at least one processor, further cause the device to:

identify whether the first signal is a first type signal related to predetermined characteristics of the absence estimation group, and based on identifying that the first signal is the first type signal, set each of the one or more first devices to a power saving standby state.

3. The device of claim 2, wherein the first type signal comprises at least one of a power turn-off signal for the first device, a designated operation end signal for the first device, and a signal indicating that a cessation of user interaction with the first device exceeds a predetermined time.

4. The device of claim 2, wherein the one or more instructions, when executed by the at least one processor, further cause the device to set each of the one or more first devices to the power saving standby state by setting a duration of a power saving standby timer to a predetermined value.

5. The device of claim 4, wherein the one or more instructions, when executed by the at least one processor, further cause the device to:

set each of the one or more first devices to the power saving state based on identifying that the second signal is a second type signal related to predetermined characteristics of the occupancy estimation group.

6. The device of claim 5, wherein the one or more instructions, when executed by the at least one processor, further cause the device to, based on identifying that the second signal is not the second type signal, extend the duration of the power saving standby timer.

7. The device of claim 5, wherein the one or more instructions, when executed by the at least one processor, further cause the device to, based on not receiving the second type signal before an end of the duration of the power saving standby timer, release each of the one or more first devices from the power saving standby state.

8. The device of claim 5, wherein the second type signal comprises a user input signal for activating an operation of the second device.

9. The device of claim 5, wherein the one or more instructions, when executed by the at least one processor, further cause the device to store current state information corresponding to each of the one or more first devices in the at least one memory as part of setting each of the one or more first devices to the power saving state.

10. The device of claim 5, wherein the one or more instructions, when executed by the at least one processor, further cause the device to set each of the one or more first devices to the power saving state by transmitting a control command for each of the one or more first devices to enter into a predetermined power saving mode.

11. The device of claim 5, wherein the one or more instructions, when executed by the at least one processor, further to cause the device to:

set each of the one or more first devices to the power saving state by transmitting a confirmation request related to a power saving state setting to a predetermined device, and based on obtaining confirmation of the power saving state setting from the predetermined device, setting each of the one or more first devices to the power saving state.

12. The device of claim 11, wherein the predetermined device comprises at least one of a predetermined user terminal, the second device, and a predetermined device among the one or more first devices.

13. The device of claim 9, wherein the one or more instructions, when executed by the at least one processor, further cause the device to:

obtain a third signal related to a device of one or more first devices set to the power saving state, and based on receiving the third signal, return each of the one or more first devices set to the power saving state to a state preceding the power saving state using the stored current state information.

14. The device of claim 13, wherein the one or more instructions, when executed by the at least one processor, further cause the device to:

classify the device of the one or more first devices into a power saving release group and store information related to the device classified into the power saving release group in the at least one memory, and return each of the one or more first devices to the state preceding the power saving state based on identifying that the third signal is related to the device.

15. The device of claim 5, wherein the one or more instructions, when executed by the at least one processor, are further configured to cause the device to:

transmit, to a predetermined device among the one or more first devices, a message inquiring whether to release the power saving state for each of the one or more first devices.

16. A method for space-specific power-saving management, the method comprising:

obtaining a first signal related to a first device of one or more first devices disposed in a first space;

after obtaining the first signal, obtaining a second signal related to a second device of one or more second devices disposed in a second space different from the first space; and based on obtaining the second signal, setting each of the one or more first devices to a power saving state, wherein the first device is classified into an absence estimation group and information indicating that the first device is classified as the absence estimation group is stored in a memory, and wherein the second device is classified into an occupancy estimation group and information indicating that the second device is classified as the occupancy estimation group is stored in the memory.

17. The method of claim 16, further comprising:

identifying whether the first signal is a first type signal related to predetermined characteristics of the absence estimation group; and based on identifying that the first signal is the first type signal, setting each of the one or more first devices to a power saving standby state.

18. The method of claim 16, wherein the setting each of the one or more first devices to the power saving state based on obtaining the second signal comprises:

identifying whether the second signal is a second type signal related to predetermined characteristics of the occupancy estimation group; and based on identifying that the second signal is the second type signal, setting each of the one or more first devices to the power saving state.

19. The method of claim 18, wherein the setting each of the one or more first devices to the power saving state further comprises:

transmitting a confirmation request related to a power saving state setting to a predetermined device; and based on obtaining confirmation of the power saving state setting from the predetermined device, setting each of the one or more first devices to the power saving state.

20. The method of claim 18, wherein at least one of the one or more first devices is classified into a power saving release group, and wherein the method further comprises:

obtaining a third signal related to a device of the one or more first devices set to the power saving state; and based on identifying that the third signal is related to a first device of the one or more first devices set to the power saving state and classified into the power saving release group, returning each of the one or more first devices to a state preceding the setting each of the one or more first devices to the power saving state.

* * * * *